(12) United States Patent
Kawaguchi et al.

(10) Patent No.: US 8,407,517 B2
(45) Date of Patent: Mar. 26, 2013

(54) METHODS AND APPARATUS FOR MANAGING ERROR CODES FOR STORAGE SYSTEMS COUPLED WITH EXTERNAL STORAGE SYSTEMS

(75) Inventors: Tomohiro Kawaguchi, Cupertino, CA (US); Akira Yamamoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 247 days.

(21) Appl. No.: 12/756,475

(22) Filed: Apr. 8, 2010

(65) Prior Publication Data

US 2011/0252274 A1   Oct. 13, 2011

(51) Int. Cl.
    *G06F 11/08*   (2006.01)
(52) U.S. Cl. .......................... 714/6.24; 714/6.2
(58) Field of Classification Search .............. 714/6.2, 714/6.24
    See application file for complete search history.

(56) References Cited

U.S. PATENT DOCUMENTS

| 7,228,380 | B2 | 6/2007 | Yamamoto et al. |
| 2002/0091718 | A1* | 7/2002 | Bohannon et al. ............ 707/202 |
| 2005/0005066 | A1 | 1/2005 | Nakayama et al. |
| 2006/0184764 | A1 | 8/2006 | Osaki |
| 2006/0236054 | A1 | 10/2006 | Kitamura |
| 2006/0271809 | A1* | 11/2006 | Ichikawa et al. ................ 714/2 |
| 2007/0288537 | A1* | 12/2007 | Bourbonnais et al. ....... 707/204 |
| 2008/0109615 | A1 | 5/2008 | Morishita et al. |
| 2008/0140944 | A1* | 6/2008 | Arakawa et al. ............ 711/148 |
| 2008/0184063 | A1* | 7/2008 | Abdulvahid .................. 714/6 |
| 2008/0195832 | A1 | 8/2008 | Takada et al. |
| 2008/0301763 | A1* | 12/2008 | Sasaki et al. ................... 726/1 |
| 2009/0132760 | A1* | 5/2009 | Flynn et al. ................. 711/113 |
| 2009/0150599 | A1* | 6/2009 | Bennett ....................... 711/103 |
| 2009/0276588 | A1* | 11/2009 | Murase ....................... 711/160 |
| 2010/0031000 | A1* | 2/2010 | Flynn et al. ................. 711/216 |
| 2010/0077160 | A1* | 3/2010 | Liu et al. ..................... 711/162 |
| 2010/0122148 | A1* | 5/2010 | Flynn et al. ................. 714/773 |
| 2011/0231362 | A1* | 9/2011 | Attarde et al. .............. 707/609 |

FOREIGN PATENT DOCUMENTS

JP   P2000-347815 A1   12/2000
JP   P2001-202295 A1   7/2001

OTHER PUBLICATIONS

Aguilera et al., "Improving Recoverability in Multi-tier Storage Systems," Dependable Systems and Networks, 2007. DSN '07. 37th Annual IEEE/IEFIP International Conference on, pp. 677-686, Jun. 25-28, 2007.*

* cited by examiner

*Primary Examiner* — Chae Ko
(74) *Attorney, Agent, or Firm* — Mattingly & Malur, PC

(57) ABSTRACT

A system comprising a plurality of storage systems, which uses storage devices of multiple levels of reliability. The reliability as a whole system is increased by keeping the error code for the relatively low reliability storage disks in the relatively high reliability storage system. The error code is calculated using hash functions and the value is used to compare with the hash value of the data read from the relatively low reliability storage disks.

15 Claims, 29 Drawing Sheets

112-11-1

| RAID Gr.# | RAID Lv. | Disk# | Capacity | Reliability |
|---|---|---|---|---|
| 0 | 5 | 0-3 | 900[GB] | High |
| 1 | 5 | 4-7 | 3000[GB] | High |
| 2 | 5 | 8-11 | 3000[GB] | High |
| 3 | Ext/5 | 12:34:56:78:9A:BC/0 | 0[GB] | Low |
| 4 | Ext/1 | 12:34:56:78:9A:BC/1 | 0[GB] | Low |
| 5 | NULL | NULL | 0[GB] | NULL |
| 6 | Ext/5 | 11:22:33:44:55:66/0 | 1500[GB] | High |
| 7 | 10 | 68-72 | 1500[GB] | High |

RAID Group Management Table

Fig. 3

| Vol# | Capacity | RAID Gr.# | Addres Range | Port# | LUN |
|---|---|---|---|---|---|
| 0 | 10[GB] | 1 | 0x00000000 – 0x0FFFFFFF | 0 | 0 |
| 1 | 30[GB] | 0 | 0x00000000 – 0x2FFFFFFF | 0 | 1 |
| 2 | 20[GB] | 1 | 0x10000000 – 0x2FFFFFFF | 0 | 2 |
| 3 | 60[GB] | 7 | 0x00000000 – 0x5FFFFFFF | 0 | 3 |
| 4 | N/A | N/A | N/A | N/A | N/A |
| 5 | 60[GB] | 2 | 0x00000000 – 0x5FFFFFFF | 1 | 0 |
| 6 | N/A | N/A | N/A | N/A | N/A |
| 7 | N/A | N/A | N/A | N/A | N/A |

Volume Management Table

Fig. 4

| 112-11-3-1 | 112-11-3-2 | 112-11-3-3 |
| --- | --- | --- |
| Virtual Volume# | Slot# | Error Check Code |
| 0 | 0 | 48c959b8b900656bb883dbf91ab1ddecf2a41de2 |
| 0 | 1 | 6d272d271202ed48936e5e395a7a90e0ff798566 |
| 0 | 2 | 10ea371937de976c062206f3584d064e795d0b13 |
| 0 | 3 | 36a0b960d7236803c0267459517297360e67c1cc |
| 0 | 4 | 1917797748647cba5cf23bca2d001bcaead13c25 |
| 0 | 5 | 0aa42567b1810aa0c764e8e215773d2b57db153a |
| 1 | 0 | 1f9155acbde94b792ad2cdafa3a10172b95cef2e |

External Volume Error Check Table 112-11-3

Fig. 5

| | 112-14-1 | 112-14-2 | 112-14-3 | 112-14-4 |
|---|---|---|---|---|
| | Index | Disk Number # | LBA | Next |
| | 0 | 2 | 0xA00 | 1 |
| | 1 | 1 | 0x7E000 | 2 |
| | 2 | 1 | 0x9700 | 3 |
| | 3 | 0 | 0x0000 | NULL |
| | 4 | 2 | 0xC500 | 5 |
| | 5 | 1 | 0x1100 | 6 |
| | 6 | 1 | 0xFF00 | NULL |

| 112-14-5 | 112-14-6 |
|---|---|
| Kind of Queue | Pointer |
| Free | 2 |
| Clean | 1 |
| Dirty | 4 |

Cache Management Table 112-14

Fig. 6

| RAID Gr.# | RAID Lv. | Disk# | Capacity |
|---|---|---|---|
| 0 | 5 | 0-3 | 900[GB] |
| 1 | 5 | 4-7 | 3000[GB] |
| 2 | 5 | 8-11 | 3000[GB] |
| 3 | Ext | 12:34:56:78:9A:BC/0, 12:34:56:78:9A:BC/1 | 0[GB] |
| 4 | Ext | 12:34:56:78:9A:BC/2, 12:34:56:78:9A:BC/3 | 0[GB] |
| 5 | NULL | NULL | 0[GB] |
| 6 | 10 | 64-67 | 1500[GB] |
| 7 | 10 | 68-72 | 1500[GB] |

RAID Group Management Table

Fig. 26 ed via Fibre Channel (FC). The storage subsystem 100 receives
METHODS AND APPARATUS FOR MANAGING ERROR CODES FOR STORAGE SYSTEMS COUPLED WITH EXTERNAL STORAGE SYSTEMS

BACKGROUND OF THE INVENTION

This invention is related to method and apparatus to manage high reliability of data stored in low tier storage systems coupled with high tier storage systems.

In multi tiered storage systems, the system may be configured of a plurality of storage systems having different capacities and performance reliabilities. Users would decide the tier to store the data by its budget, load and importance. To increase data reliability, data correction code may be added to the data, such as disclosed in JP2000-347815. However, when data includes data correction code, low tier storage may not be able to support the added error code. This may effect the total reliability of the system considering data migration within the system.

SUMMARY OF THE PRESENT INVENTION

Exemplary embodiments of the invention provide a system comprising a plurality of storage systems, which uses storage devices of multiple levels of reliability. The reliability as a whole system is increased by keeping the error code for the relatively low reliability storage devices in the relatively high reliability storage system. The error code is calculated using hash functions and the value is used to compare with the hash value of the data read from the relatively low reliability storage disks.

In one embodiment, the relatively high reliability storage system calculates the correct data by obtaining the relevant data required from the relatively low reliability storage system. In an another embodiment, the relatively high reliability storage system requests the relatively low reliability storage system to generate the correct data.

BRIEF DESCRIPTION OF THE DRAWING

FIG. 3 illustrates an example of a RAID Group Management Table in the memory of FIG. 2.

FIG. 4 illustrates an example of a Volume Management Table in the memory of FIG. 3.

FIG. 5 illustrates an example of a External Volume Error Code Table in the memory of FIG. 3.

FIG. 6 illustrates an example of a Cache Management Table in the memory of FIG. 3.

FIG. 26 illustrates an example of a RAID Group Management Table in the memory of FIG. 25.

DETAILED DESCRIPTION OF A PREFERRED EMBODIMENT OF THE PRESENT INVENTION

First Embodiment

Figure 1:
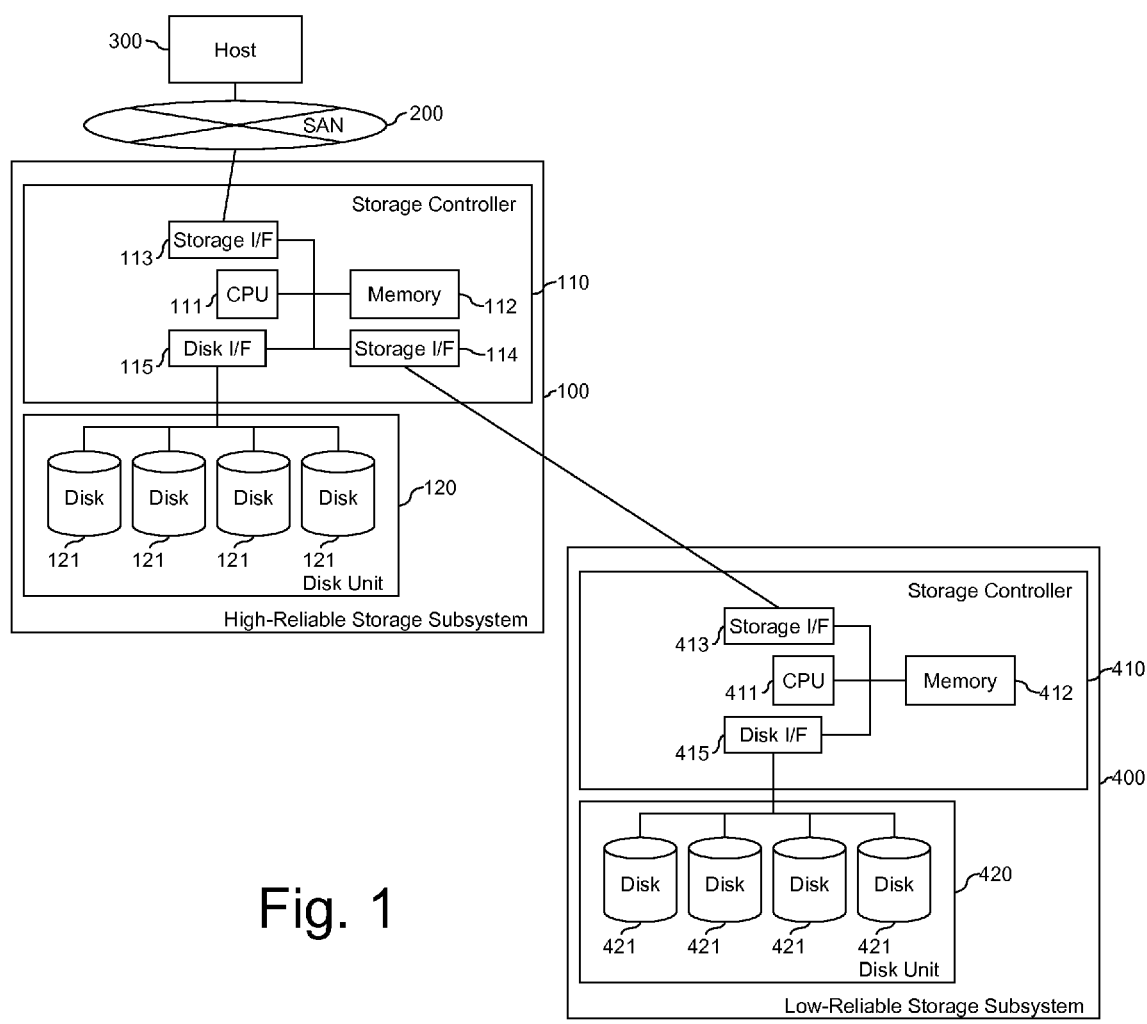
FIG. 1 illustrates an example of overview of a configuration of the invention.

FIG. 1 illustrates the hardware configuration of a system in which the method and apparatus of the invention may be applied. A storage subsystem 100 is connected via a SAN (storage area network) 200 to a host computer 300. The storage subsystem 400 is connected to the storage subsystem 100 via Fibre Channel (FC). The storage subsystem 100 receives I/O commands from the host computer 200 and provides storage volumes to the host computer 200 using storage devices 121, 421 in both storage subsystems 100, 400. The storage subsystem 100 has a higher data reliability than the storage subsystem 400.

The storage subsystem 100 has a storage controller 110 that includes a CPU 111, a memory 112, storage interfaces 113, 114, and disk interface 115. The CPU 111 controls the storage subsystem 100, and reads programs and tables from the memory 112. The memory 112 stores the programs and tables. The storage interface 113 connects with a host computer 300 via a storage network 200. The storage interface 114 connects with a storage interface 413 of the storage subsystem 400. The disk interface 115 connects with a plurality of storage devices 121, which are stored in a disk unit 120. The storage devices 121 are comprised of solid state devices, such as flash memories, and/or hard disk drives (HDD), for storing data. The storage network 200 connects the storage subsystem 100 and the host computer 300. The host computer 300 sends I/O requests to the storage subsystem 100 via the storage network 200, and sends data to and receives data from the storage subsystem 100 via the storage network 200. The storage subsystem 400 has a storage controller 410 that includes a CPU 411, a memory 412, storage interfaces 413, and disk interface 115. The storage subsystem 200 is the external storage of the storage subsystem 100 and would receive from and send data to the host computer 300 via the storage subsystem 100 and the storage network 200. The CPU 411 controls the storage subsystem 400, and reads programs and tables from the memory 412. The memory 412 stores the programs and tables. The disk interface 415 connects with a plurality of storage devices 421, which are stored in a disk unit 420. The storage devices 421 are comprised of solid state devices, such as flash memories, and/or hard disk drives (HDD), for storing data. Comparing the two storage subsystems, the storage subsystem 100 has a relatively higher reliability than the storage subsystem 400. In this example, the disk unit 120 used for internal volumes is comprised of higher grades of storage devices compared to the disk unit 420 used for external volumes, such that SLC (Single Level Cell) flash memory is used in disk unit 120, while MLC (multi Level Cell) flash memory or relatively cheap SATA (Serial Attached ATA) HDD is used in disk unit 420. The number or grade of processors in the CPU or the capacity of the memory for the storage controller 110 may be larger than that for the storage controller 410. By using a relatively high grade processor in the storage subsystem 100 compared to the ones used in the storage subsystem 400, higher reliability of data processing by the storage controller 100 would enhance reliability of the data stored in the storage subsystem 400.

Figure 2:
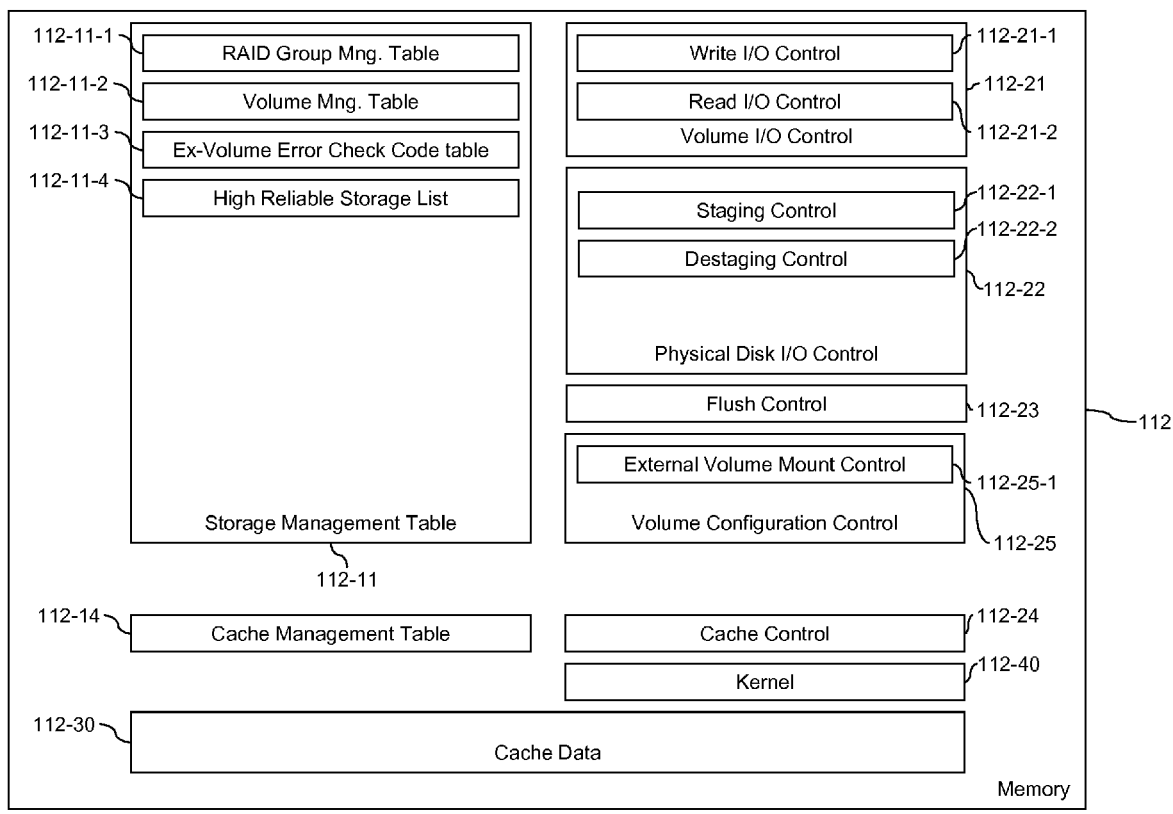
FIG. 2 illustrates an example of a memory in the storage subsystem 100 of FIG. 1.

FIG. 2 illustrates an example of a memory 112 in the storage subsystem 100 of FIG. 1. The memory 112 includes a Storage Management Table 112-11 that includes a RAID Group Management Table 112-11-1, a Volume Management Table 112-11, an Ex-Volume Error Check Code Table 112-11-3, and a High Reliable Storage List 112-11-4. Management Table 112-11. The RAID Group Management Table 112-11-1 provides physical structure management for storage devices 121, external volumes and those groups. A Volume Management Table 112-11-2 provides logical volume configuration. An External Volume Error Check Code Table 112-11-3 stores error check code for some areas of external volumes. The value of error check code for an area is calculated from data stored in such area by hash calculation. A High Reliable Storage List 112-11-4 stores high product storage product names or product IDs, which is used to determine whether the storage is relatively low reliability or not. If the storage product used for the storage system is not stored in the list, the storage is treated as a relatively low reliability and the error code will be stored in a relatively high reliability storage system. A Cache Management Table 112-14 is provided for managing the cache data area 112-30 and for LRU/MRU management. A Volume I/O Control 112-21 includes a Write I/O Control 112-21-1(FIG. 8) that runs by a write I/O requirement and receives write data and stores to the cache data area 112, and a Read I/O Control 112-21-2 (FIG. 9) that runs by a read I/O requirement and sends read data from the cache data area 112. A Disk Control 112-22 includes a Staging Control 112-22-1 (FIG. 10) that transfers data from the disks 121 to the cache data area 112, a Destaging Control 112-22-2 (FIG. 11) that transfers data from the cache data area 112 to the disks 121. The memory 112 further includes a Flush Control 112-23 (FIG. 12) that periodically flushes dirty data from the cache data area to the disks 121, and a Cache Control 112-24 that finds cached data in the cache data area and allocates a new cache area in the cache data area. The memory 112 includes a Cache Data Area 112-30 that stores read and write cache data. The area is divided for a plurality of cache slots. Each cache slot is allocated for a data stripe. The memory 112 includes a kernel 112-40 that controls the schedules of running program, supports a multi-task environment. If a program waits for an ack (acknowledgement), the CPU 111 changes to run another task (e.g., data transfer waiting from the disk 121 to the cache data area 112-30). The memory 112 includes External Volume Mount Control 112-26 (FIG. 13) that controls mounting of external volumes mounting.

Figure 29:
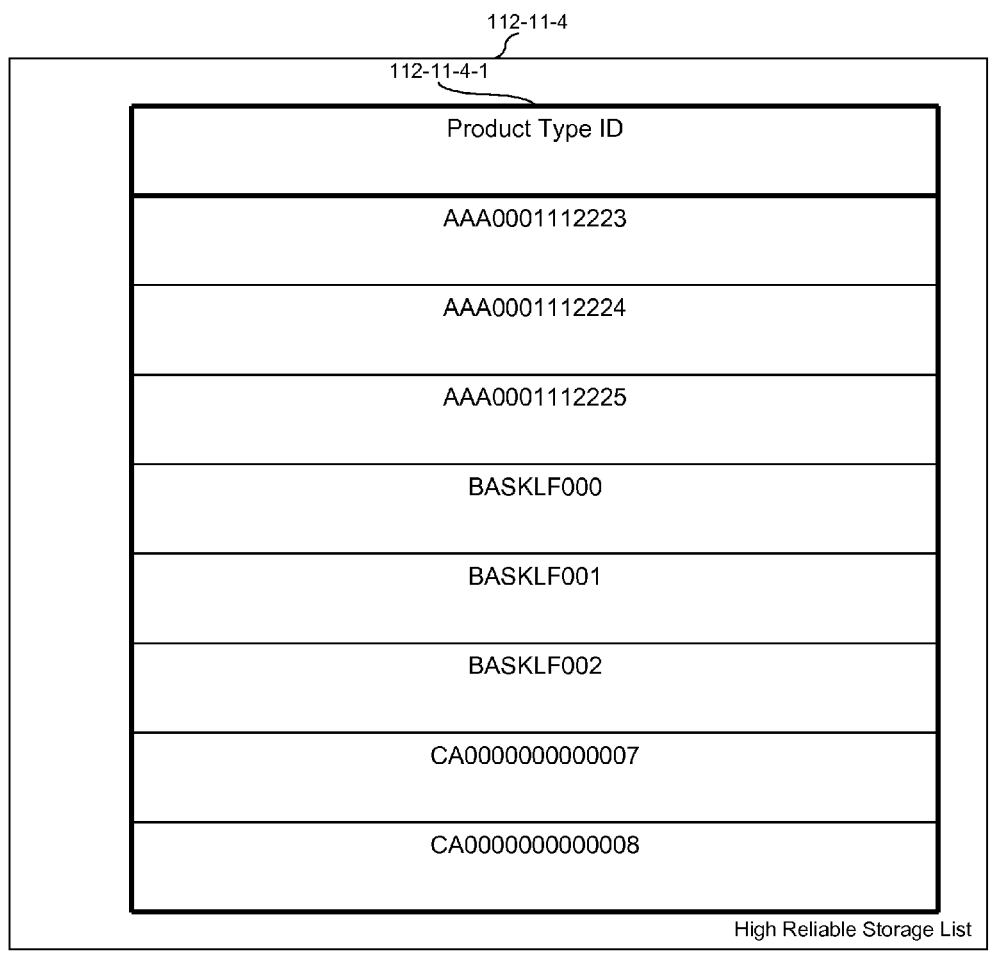
FIG. 29 illustrates an example of a storage list in the memory of FIG. 2.

FIG. 3 illustrates an example of a RAID Group Management Table 112-11-1 in the memory 112 of FIG. 2. The RAID Group Management Table 112-11-1 includes columns of the RAID Group Number 112-11-1-1 as the ID of the RAID group, and RAID Level 112-11-1-2 representing the structure of RAID group. For example, "5" means "RAID Level is 5". "NULL" means the RAID Group does not exist. "Ext/1" means the RAID Group exists as an external volume outside of the internal volume and has a RAID Level of 1. The RAID Group Management Table 112-11-1 includes columns 112-11-1-3 of the HDD Number representing the ID list of HDDs belonging to the RAID group in case if it is an internal volume, or a WWN (World Wide Name) in case if it is an external volume. The RAID Group Management Table 112-11-1 further includes RAID Group Capacity 112-11-1-4 representing the total capacity of the RAID group except redundant area. The RAID Group Management Table 112-11-1 further includes Reliability 112-11-1-5 representing the reliability of the storage devices. The reliability of the storage devices may be set manually by the management server, or may be determined by checking whether the product is included in a High Reliability Storage List 112-11-4 as in FIG. 29. If the product type ID of the storage device matches one of the Product Type ID 112-11-4-1 of the list, it would be determined as a relatively high reliability and if it does not match any, it would be determined as a relatively low reliability. Product Type IDs may be added or deleted by the management server. The list may list relatively low reliability products and the determination could be made vice versa.

FIG. 4 illustrates an example of a Volume Group Management Table 112-11-2 in the memory 112 of FIG. 2. The Volume Group Management Table 112-11-2 includes columns of the Volume Number 112-11-2-1 as the ID of the volume, and Capacity 112-11-2-1 representing the capacity of volume. "N/A" means that the volume does not actually exist, thus there is no relative information for that volume. The Volume Group Management Table 112-11-2 further includes RAID Group Number 112-11-2-3 representing the RAID group number 112-11-1-1, which is used by the volume, and Address Range 112-11-2-5, which shows the range of addresses used for the volume. The Volume Group Management Table 112-11-2 further includes Port Number 112-11-2-6 representing the port number by which the volume can be accessed, and LUN 112-11-2-7 representing the ID of the volume recognized through the port.

FIG. 5 illustrates an example of an External Volume Error Check Code Table 112-11-3 in the memory 112 of FIG. 2. The External Volume Error Check Code Table 112-11-3 includes columns of the Virtual Volume Number 112-11-3-1 as the ID of the virtual volume, and Slot Number 112-11-3-2 representing the ID of the slot. The External Volume Error Check Code Table 112-11-3 further includes Error Check Code 112-11-3-3 representing the error check code of the external volume, which is the calculated hash value of the data in the slot.

FIG. 6 illustrates an example of a Cache Management Table 112-14 in the memory 112 of FIG. 2. The Cache Management Table 112-14 includes columns of the Index 112-14-1 as the ID of the cache slot in the Cache Data Area 112-30, and Disk Number 112-14-2 representing the ID of the disk 121 that the cache slot stores the corresponding data. The Cache Management Table 112-14 further includes LBA 112-14-3 representing the Logical Block Address of the disk storing the corresponding data and Next 112-14-4 representing the next cache slot number for queue management. "NULL" means there is no consecutive queue behind and that the queue terminates at that slot. The Cache Management Table 112-14 further includes Kind of Queue 112-14-5 representing the kind (type) of cache slot queue and Queue Index Pointer 112-14-6 representing the top slot ID of the cache slot queue, which is the next slot to be processed. "Free" slot queue is the queue that has unused cache slots, which would be used for allocating new write data. "Clean" slot queue is the queue has cache slots that stores same data in the disk slots and the data has been flushed out to the disk. "Dirty" slot queue is the queue that has not yet flushed the data out to the disk. The cache slots stores different data from the corresponding disk slots, so the storage controller 110 needs to flush data in the cache slots to the disk slots in the future using the Flush Control 112-23. After the "Dirty" slot is flushed to the disk, the slot would change the slot status to "Clean".

Figure 7:
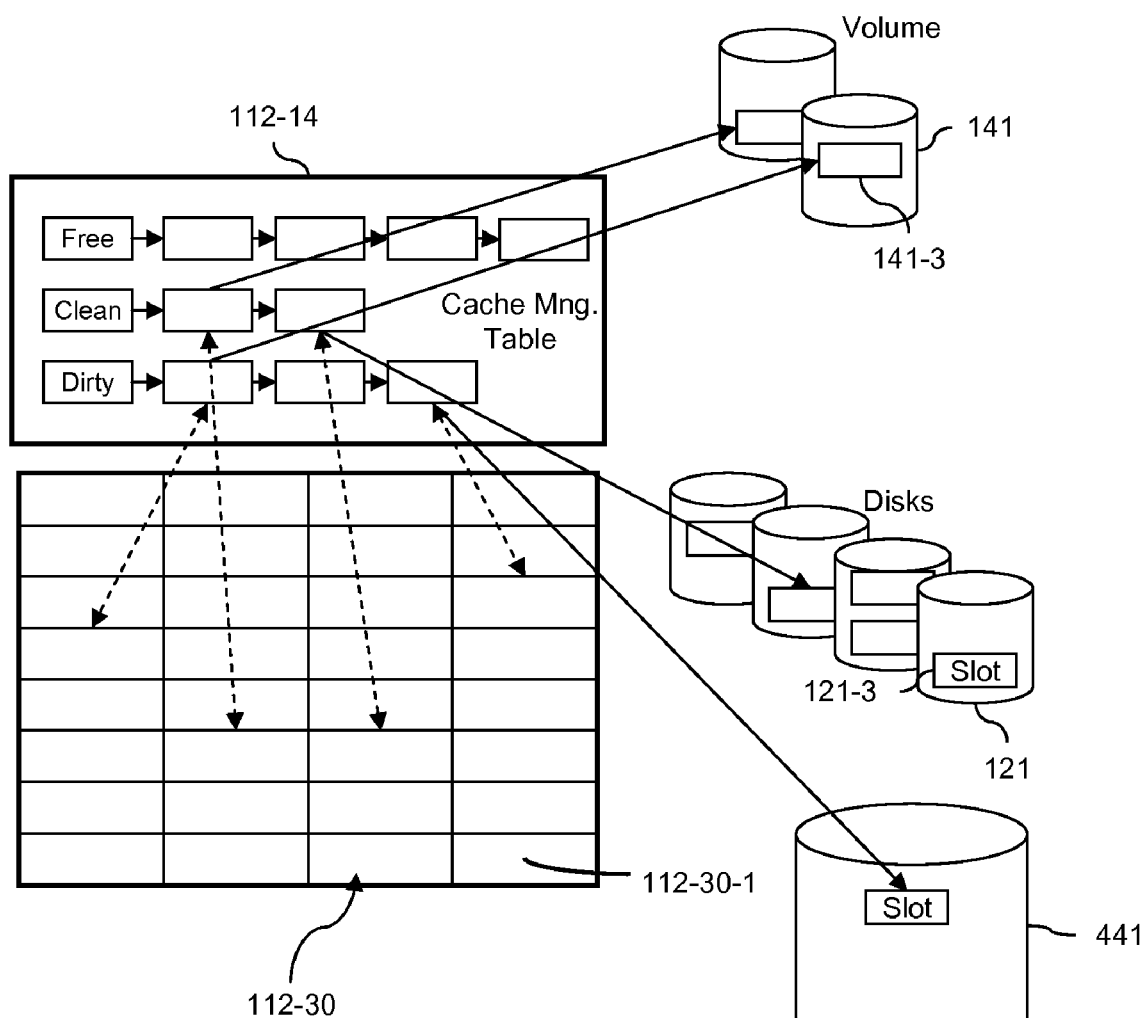
FIG. 7 illustrates an example of allocation for the Cache Management Table in the memory of FIG. 1.

FIG. 7 illustrates an example of a logical structure of the storage system 100 of FIG. 1. The dashed line represents that the pointer refers the object. The solid line represents that the object is referred by calculation. The Cache Data 112-30 of FIG. 2 is divided into plurality of Cache Slots 112-30-1. The sizes of Cache Slots are same as the sizes of Capacity Pool Stripe 121-3 and Virtual Volume Slots 141-3. The Cache Management Table 112-14 and the Cache Slot 112-30-1 correspond to each other and are in one to one relation. The Cache Management Table 112-14 refers to the Virtual Volume Slot 141-3 and the Capacity Pool Stripe 121-3.

Figure 8:
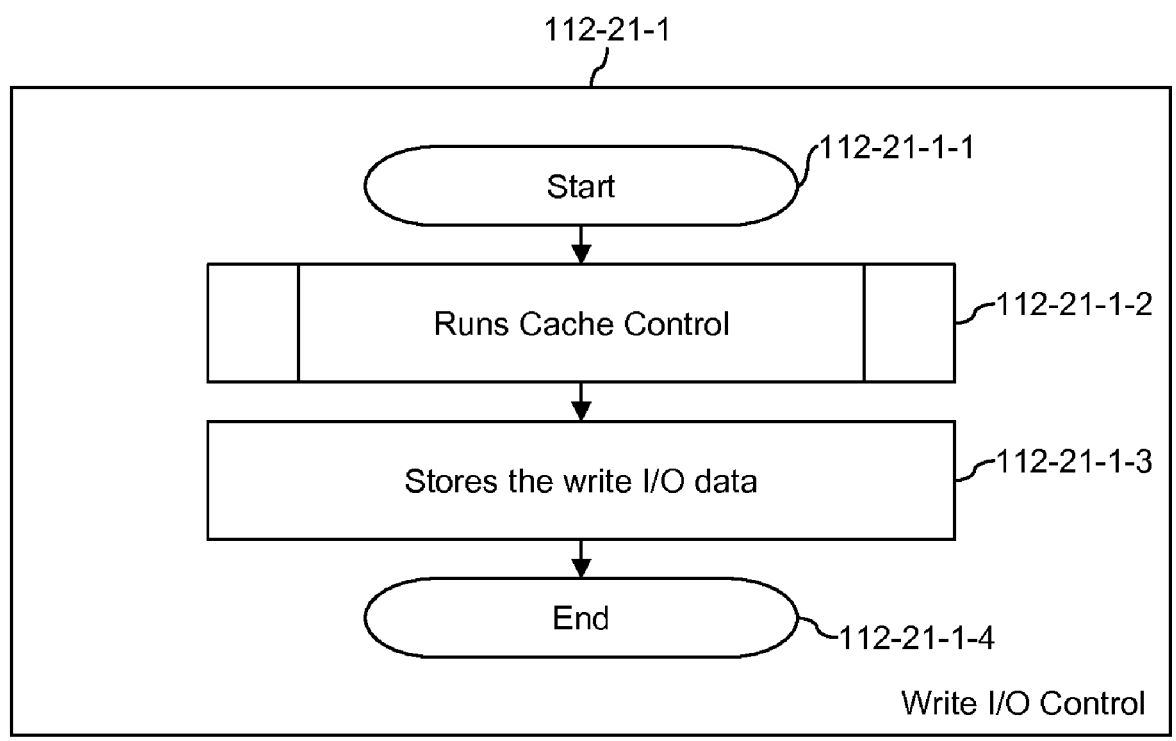
FIG. 8 illustrates an example of a write I/O control sequence of the storage subsystem 100 of FIG. 1.

FIG. 8 illustrates an example of a process flow of the Write I/O Control 112-21-1 in the memory 112 of FIG. 2. The program starts at 112-21-1-1. In step 112-21-1-2, the program calls the Cache Control 112-24 to search the cache slot 112-30-1. In step 112-21-1-3, the program receives the write I/O data from the host computer 300 and stores the data to the aforementioned cache slot 112-30-1. The program ends at 112-21-1-4.

Figure 9:
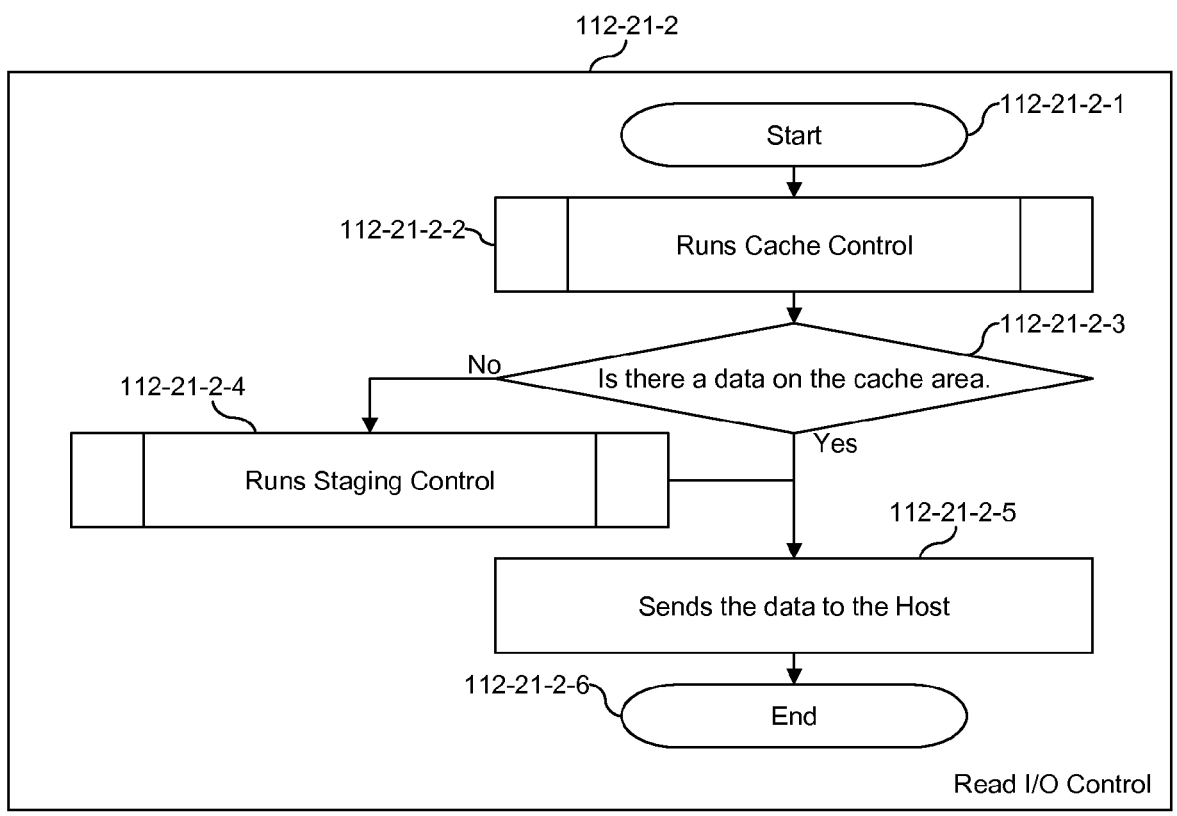
FIG. 9 illustrates an example of a read I/O control sequence of the storage subsystem 100 of FIG. 1.

FIG. 9 illustrates an example of a process flow of the Read I/O Control 112-21-2 in the memory 112 of FIG. 2. The program starts at 112-21-2-1. In step 112-21-2-2, the program calls the Cache Control 112-24 to search the cache slot 112-30-1. In step 112-21-2-3, the program checks the status of the aforementioned cache slot 112-30-1 to determine whether the data has already been stored there or not. If the data is not stored in the cache slot 112-30-1, the program calls the Staging Control 112-22-1 in step 112-21-2-4. In step 112-21-2-5, the program transfers the data in the cache slot 112-30-1 to the host computer 300. The program ends at 112-21-2-6.

Figure 10:
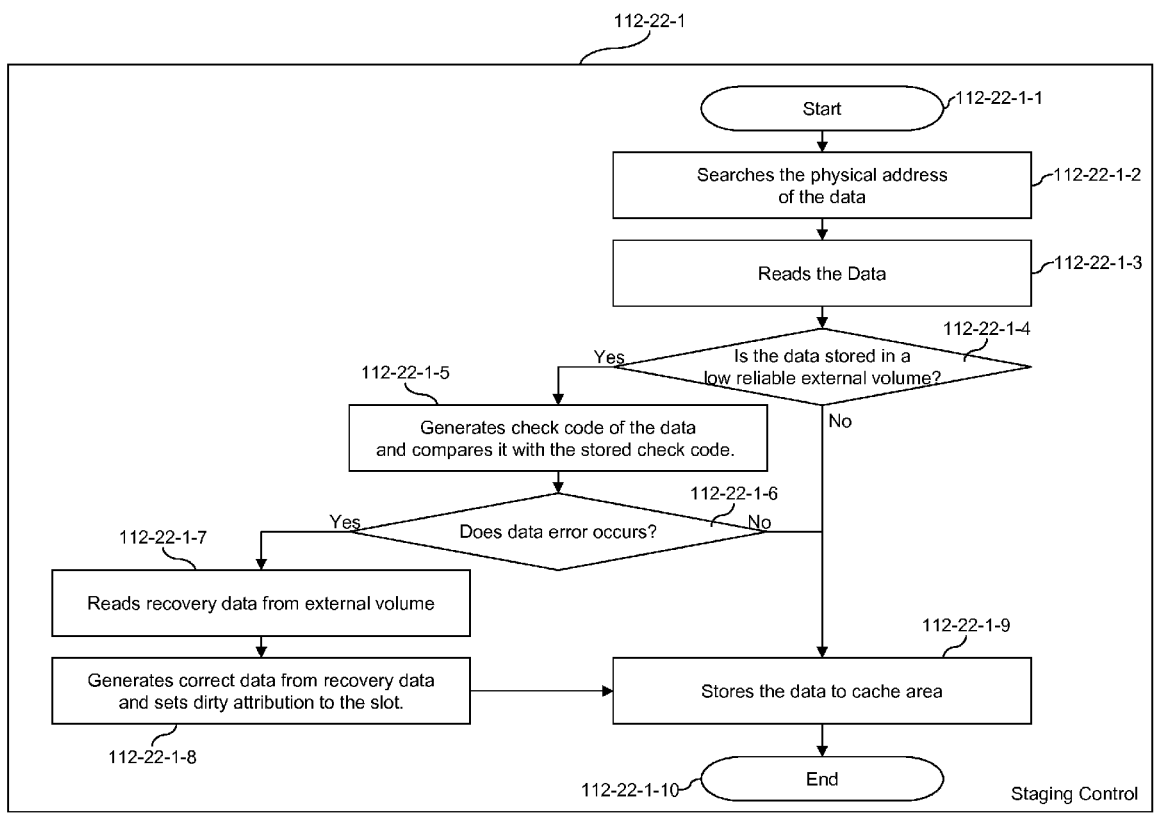
FIG. 10 illustrates an example of a staging control sequence of the storage subsystem 100 of FIG. 1.

FIG. 10 illustrates an example of a process flow of the Staging Control 112-22-1 in the memory 112 of FIG. 2. The program starts at 112-22-1-1. In step 112-22-1-2, the program refers to Volume Management Table 112-11-2 and RAID Group Management Table 112-11-1 to determine the physical disk and address of the data. In step 112-22-1-3, the program requests to read data from the slot of disk 121,141 and store it to the buffer. In step 112-22-1-4, the program checks whether the data is stored in the external volume allocated by relatively low reliability storage disks using RAID Group Management Table 112-11-1. If the data is stored in relatively low reliability storage disks, the program calculates the hash value from the data in the buffer and compares the calculated hash value with the stored error code in External Volume Error Code Table 112-11-3 in step 112-22-1-5. If the data is not stored in relatively low reliability storage disks, the program proceeds to step 112-22-1-9. In step 112-22-1-6, the program checks whether the compared values matches so that it can detect data error stored in the relatively low reliability storage disks. If the compared values do not match, the program requests for external volume to transfer recovery data in step 112-22-1-7. Thus, if the external volume is RAID 5, it would request for redundant data of the slot in the stripe row to calculate the correct data. Then, in step 112-22-1-8, the program generates correct data from the sent recovery data and sets dirty attribution against the recovered slot. The correct data will be stored in the buffer. If the external volume is RAID 5, it runs parity calculation to generate the correct data. If the data is stored in relatively low reliability storage disks does not contain data error and the compared values match, the program proceeds to step 112-22-1-9. In step 112-22-1-9, the program transfers slot data from the buffer to the cache slot 112-30 so that the corrected data would eventually be replaced to the disks and cache in the relatively low reliability storage system by Flush Control 112-23 and Destaging Control 112-22-2. The program ends at 112-22-1-10.

Figure 11:
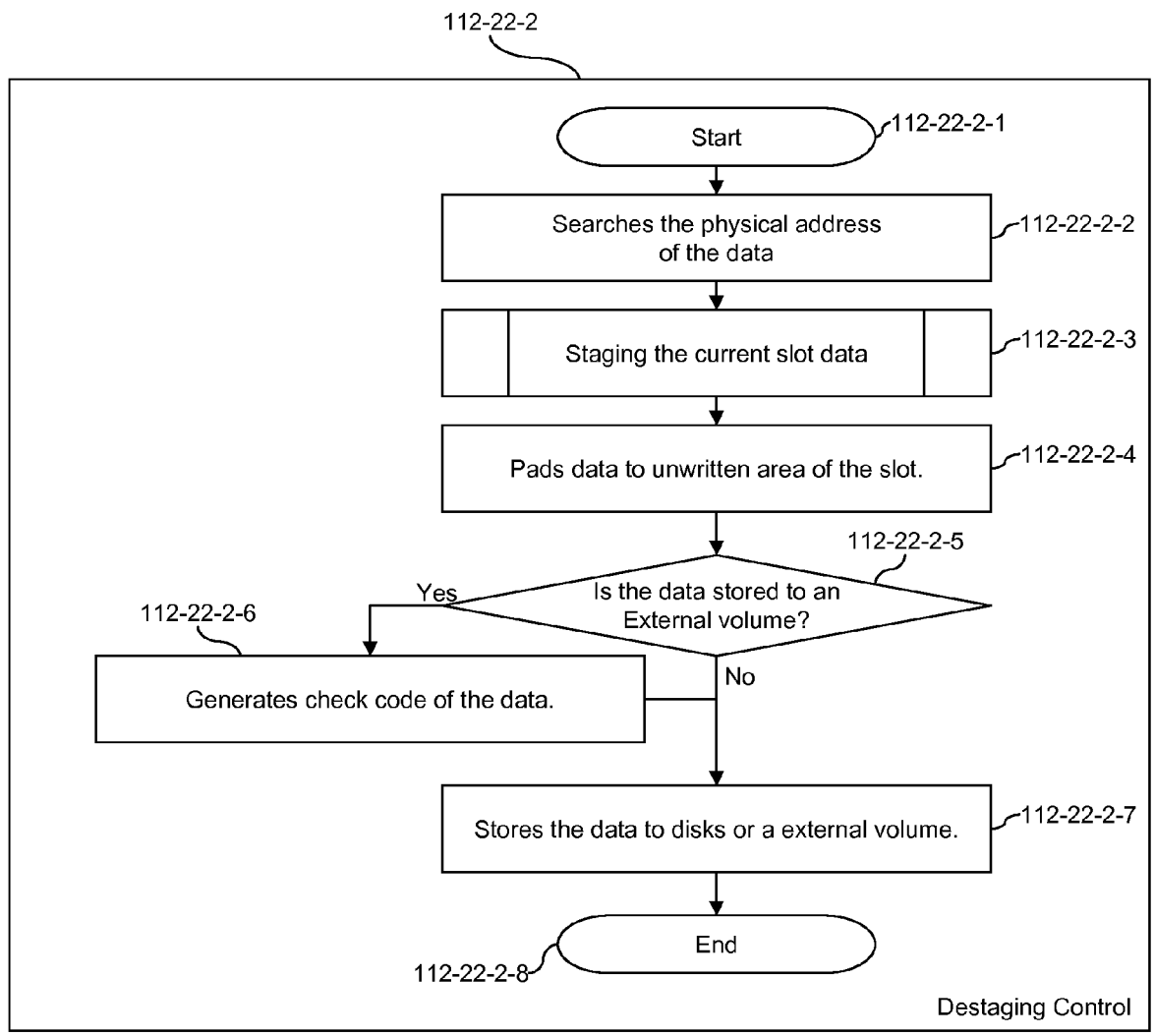
FIG. 11 illustrates an example of a destaging control sequence of the storage subsystem 100 of FIG. 1.

FIG. 11 illustrates an example of a process flow of the Destaging Control 112-22-2 in the memory 112 of FIG. 2. The program starts at 112-22-2-1. In step 112-22-2-2, the program refers to Volume Management Table 112-11-2 and RAID Group Management Table 112-11-1 to determine the physical disk and address of the data. In step 112-22-2-3, the program calls the Staging Control 112-22-1 and stages the current slot area. In step 112-22-2-4, the program fills the sent data to the unwritten area in the cache slot 112-30. In step 112-22-2-5, the program checks whether the data is to be stored in the external volume allocated by relatively low reliability storage disks using RAID Group Management Table 112-11-1. If the data is to be stored in relatively low reliability storage disks, the program calculates the hash value from the data in the cache slot and stores the calculated check code to the External Volume Error Code Table 112-11-3 in step 112-22-2-6. If the data is not stored in relatively low reliability storage disks, the program proceeds to step 112-22-2-7. In step 112-22-2-7, the program reads data from the slot in Cache Data Area 112-30 and stores to internal or external volume. The program ends at 112-22-2-8.

Figure 12:
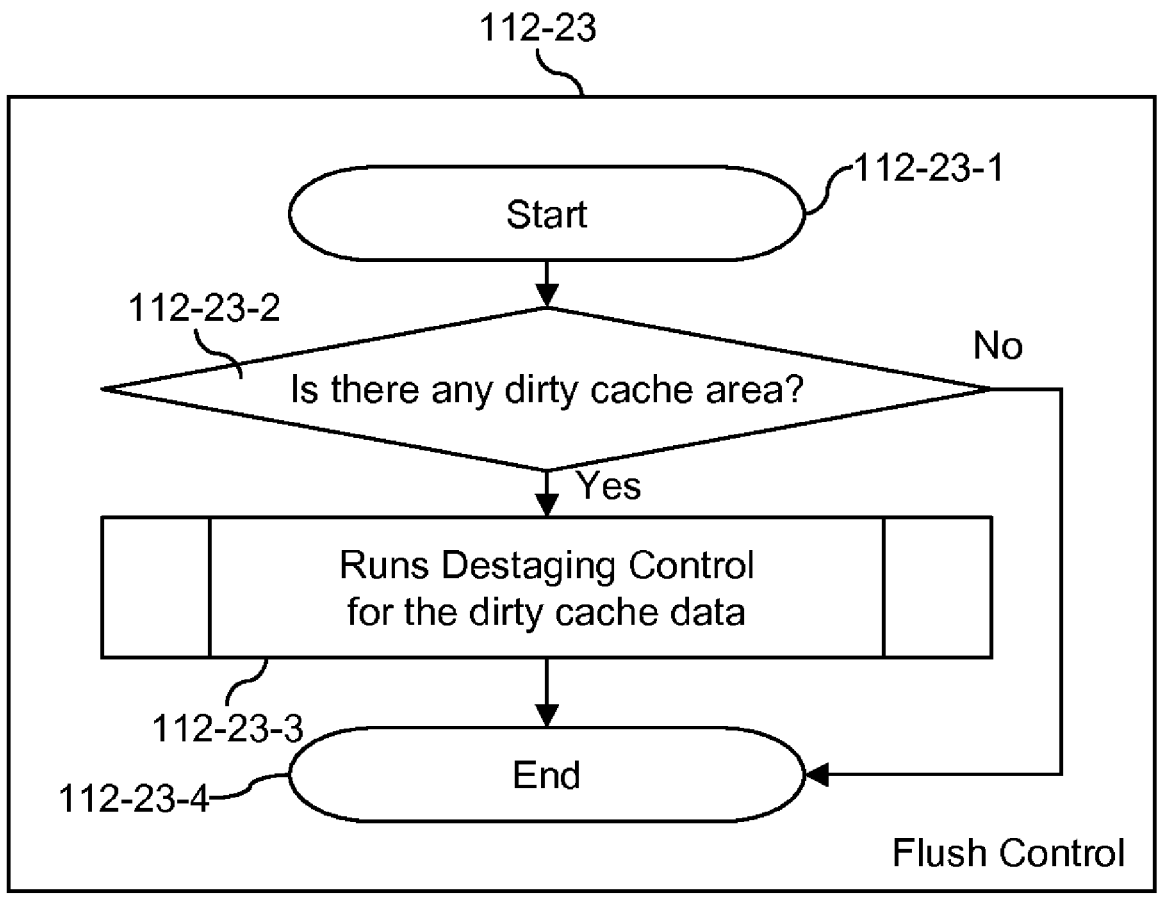
FIG. 12 illustrates an example of a flush control sequence of the storage subsystem 100 of FIG. 1.

FIG. 12 illustrates an example of a process flow of the Flush Control 112-23 in the memory 112 of FIG. 2. The program starts at 112-23-1. In step 112-23-2, the program reads the "Dirty Queue" of the Cache Management Table 112-14. If dirty cache area is found, the program calls the Destaging Control 112-22-2 for the found dirty cache slot 112-30-1 in step 112-23-3. The program ends at 112-23-4.

Figure 13:
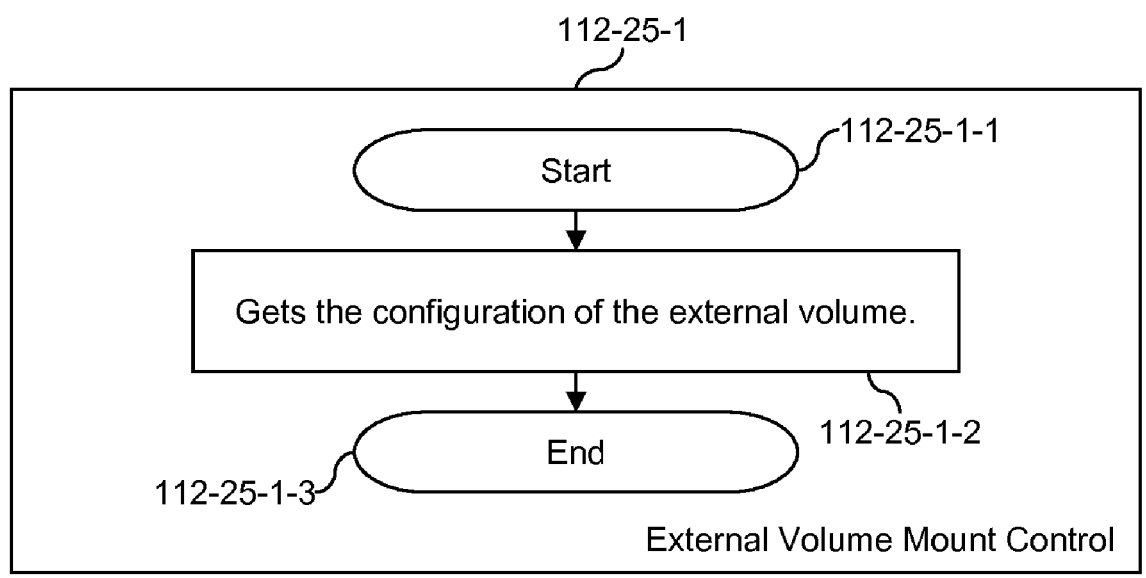
FIG. 13 illustrates an example of an external volume mount control sequence of the storage subsystem 100 of FIG. 1.

FIG. 13 illustrates an example of a process flow of the External Volume Mount Control 112-25-1 in the memory 112 of FIG. 2. The program starts at 112-25-1-1. In step 112-25-1-2, the program requests for the configuration information including the RAID level, structure, product name of the storage device used and reliability information of the external volume. The reliability information is stored to the column of Reliability 112-11-1-5 of the RAID Group Management Table 112-11-1. If the product name of the external storage is listed in High Reliable Storage List 112-11-4 or the external storage reported that it has relatively high reliability, it stores 'High' to RAID Group Reliability 112-11-1-5. If not, it stores 'Low' to RAID Group Reliability 112-11-1-5. The program ends at 112-25-1-3.

Figure 14:
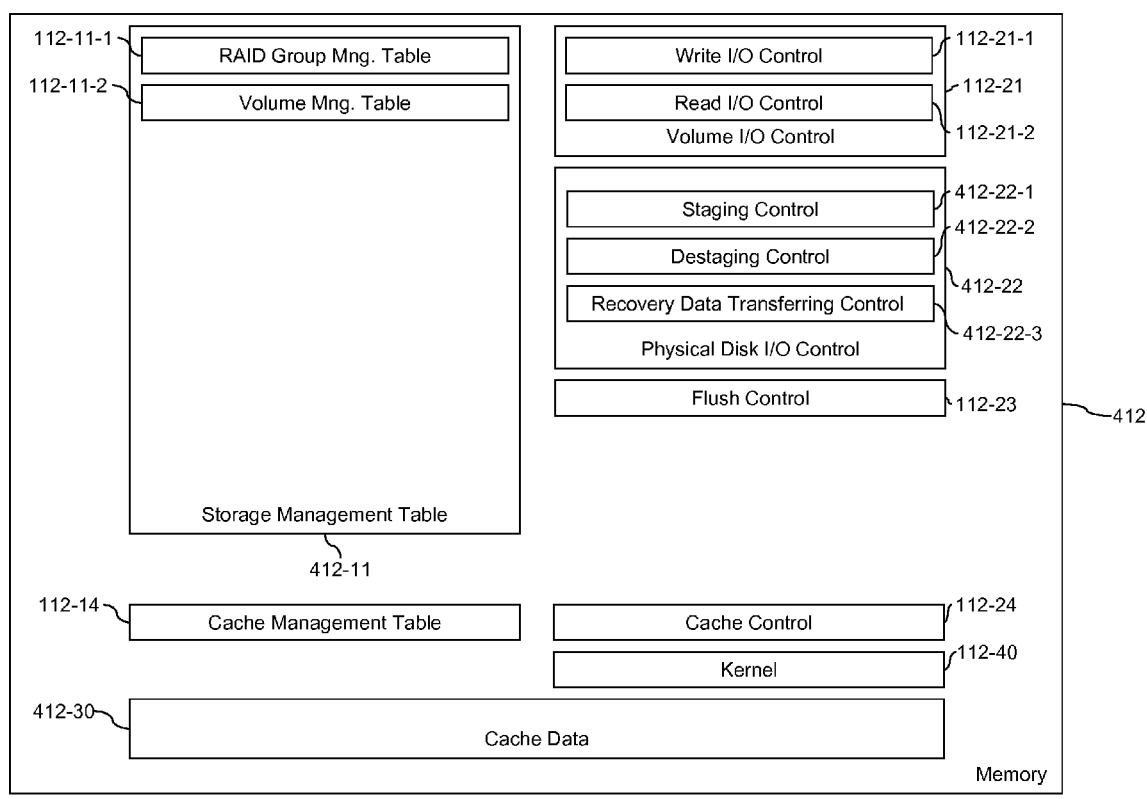
FIG. 14 illustrates an example of a memory in the storage subsystem 400 of FIG. 1.

FIG. 14 illustrates an example of a memory 412 in the storage subsystem 400 of FIG. 1. The memory 412 includes a Storage Management Table 412-11 that includes a RAID Group Management Table 112-11-1 and a Volume Management Table 112-11, which are identical to the tables in 112-11. However, the Storage Management Table 412-11 does not include an Ex-Volume Error Check Code Table 112-11-3 and a High Reliable Storage List 112-11-4 as in memory 112. A Cache Management Table 112-14 as in memory 112 is provided for managing the cache data area 112 and for LRU/MRU management. A Volume I/O Control 112-21 includes a Write I/O Control 112-21-1 (FIG. 8) that runs by a write I/O requirement and receives write data and stores to the cache data area 112, and a Read I/O Control 112-21-2 (FIG. 9) that runs by a read I/O requirement and sends read data from the cache data area 412-30 as in memory 112. A Disk Control 412-22 includes a Staging Control 412-22-1 (FIG. 15) that transfers data from the disks 421 to the cache data area 412-30, a Destaging Control 412-22-2 (FIG. 16) that transfers data from the cache data area 412-30 to the disks 421, and a Recovery Data Transferring Control 412-22-3 (FIG. 17) that transfers redundant data including parity bits of a designated area to generate correct data. The memory 112 further includes a Flush Control 112-23 that periodically flushes dirty data from the cache data area to the disks 421, and a Cache Control 112-24 that finds cached data in the cache data area and allocates a new cache area in the cache data area as in memory 112. The memory 412 includes a Cache Data Area 412-30 that stores read and write cache data. The area is divided for a plurality of cache slots. Each cache slot is allocated for a data stripe. The memory 412 includes a kernel 112-40 that controls the schedules of running program, supports a multi-task environment as in memory 112.

Figure 15:
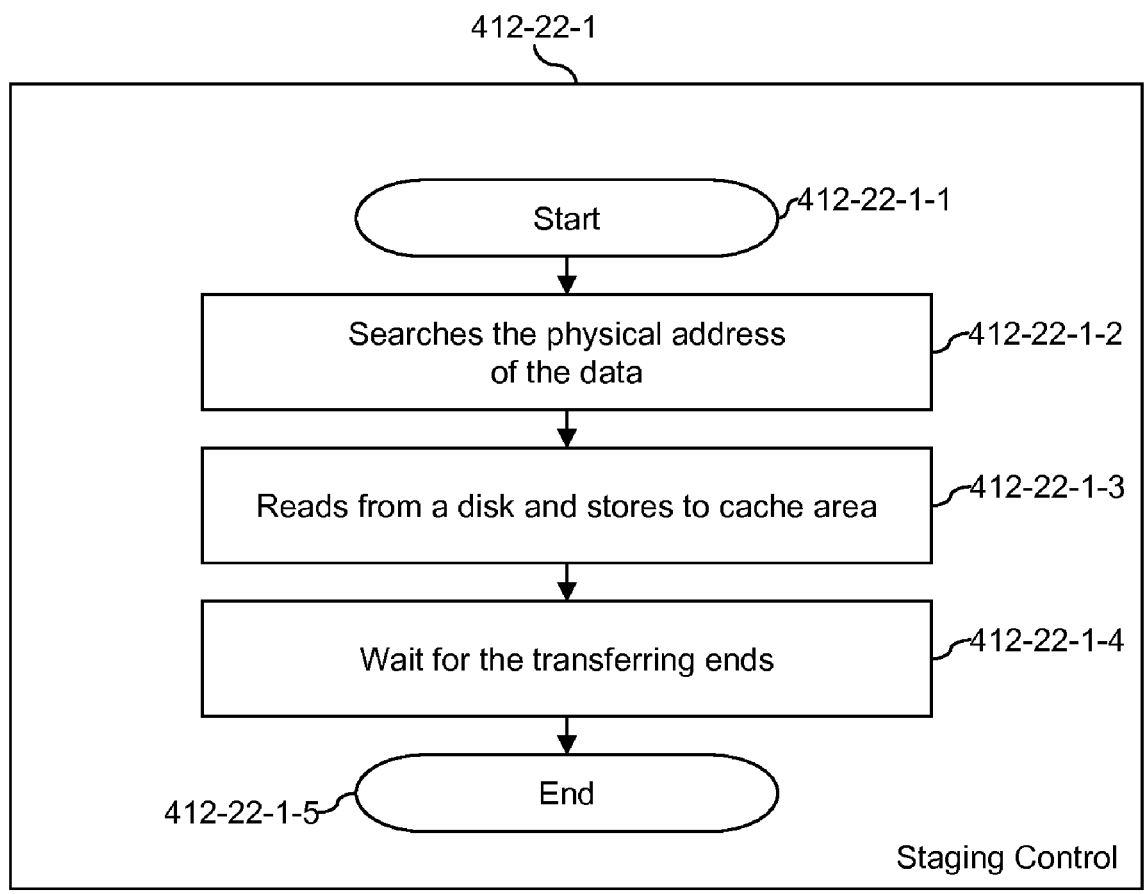
FIG. 15 illustrates an example of a staging control sequence of the storage subsystem 400 of FIG. 1.

FIG. 15 illustrates an example of a process flow of the Staging Control 412-22-1 in the memory 412 of FIG. 14. The program starts at 412-22-1-1. In step 412-22-1-2, the program refers to Volume Management Table 112-11-2 and RAID Group Management Table 112-11-1 to determine the physical disk and address of the data. In step 412-22-1-3, the program requests to read data from the disk 421 and store it to the cache data area 412-30. In step 412-22-1-4, the program waits for the data transfer to end. The kernel 112-40 in the memory 412 will issue an order to do context switch. The program ends at 412-22-1-5.

Figure 16:
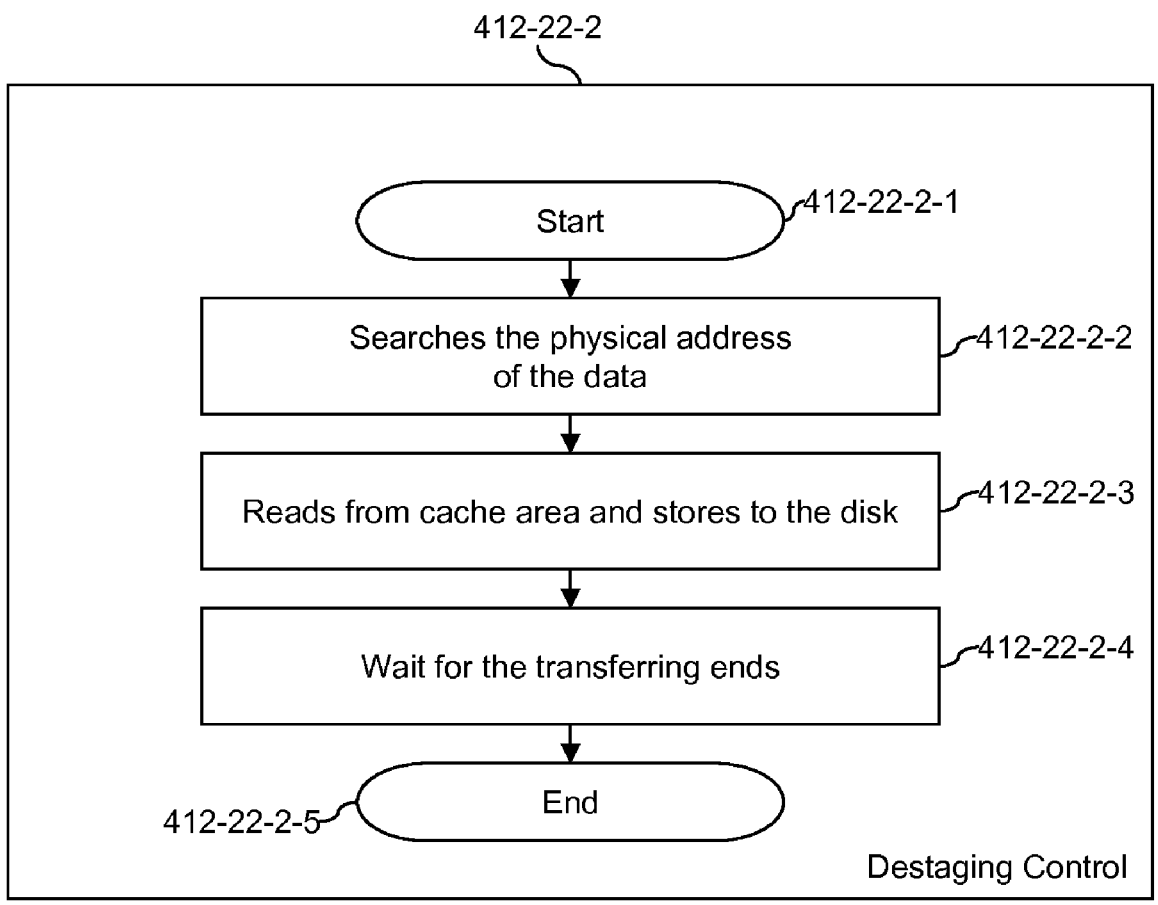
FIG. 16 illustrates an example of a destaging control sequence of the storage subsystem 400 of FIG. 1.

FIG. 16 illustrates an example of a process flow of the Destaging Control 412-22-2 in the memory 412 of FIG. 14. The program starts at 412-22-2-1. In step 412-22-2-2, the program refers to Volume Management Table 112-11-2 and RAID Group Management Table 112-11-1 to determine the physical disk and address of the data. In step 412-22-2-3, the program requests to read data from the cache data area 412-30 and store it to the disk 421. In step 412-22-2-4, the program waits for the data transfer to end. The kernel 112-40 in the memory 412 will issue an order to do context switch. The program ends at 412-22-2-5.

Figure 17:
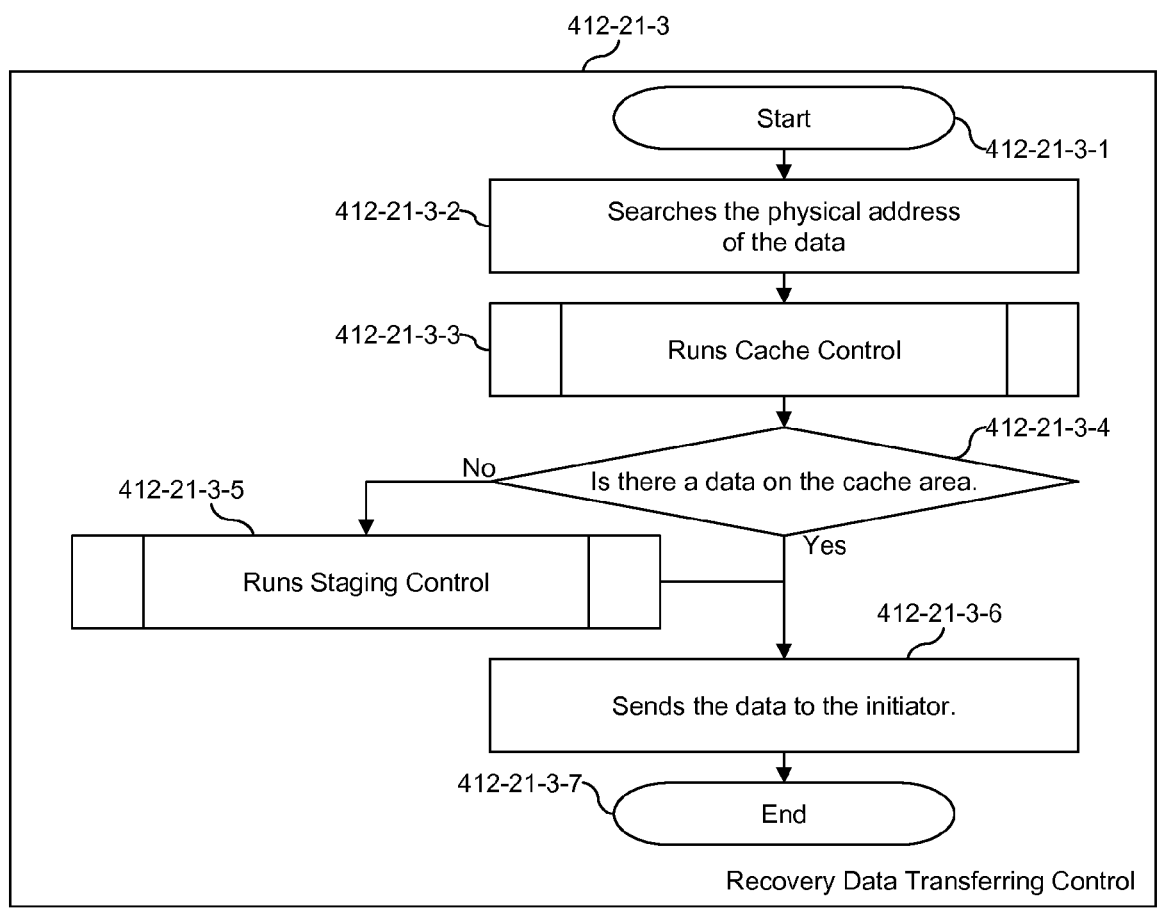
FIG. 17 illustrates an example of a recovery data transferring control sequence of the storage subsystem 400 of FIG. 1.

FIG. 17 illustrates an example of a process flow of the Recovery Data Transferring Control 412-21-3 in the memory 412 of FIG. 14. The program starts at 412-21-3-1. In step 412-21-3-2, the program refers to Volume Management Table 112-11-2 and RAID Group Management Table 112-11-1 to determine the physical disk and address of the data. In step 412-21-3-3, the program calls the Cache Control 112-24 to search the corresponding Cache Slot 412-30-1. In step 412-21-3-4, the program checks the status of foresaid Cache Slot 412-30-1. If the data has not yet been stored to the cache, the program calls the Staging Control 412-21-1 in step 412-21-3-5. If the data has already been stored to the cache, the program moves to step 412-21-3-6. In step 412-21-3-6, the program transfers the Cache Slots 112-30-1 data to the initiator. Thus, if Staging Control 112-22-1 in memory 112 calls the program, the data would be transferred to the Storage Controller 110 so that it can generate the correct data in the relatively high storage system 100. The program ends at 412-21-3-7.

Figure 18:
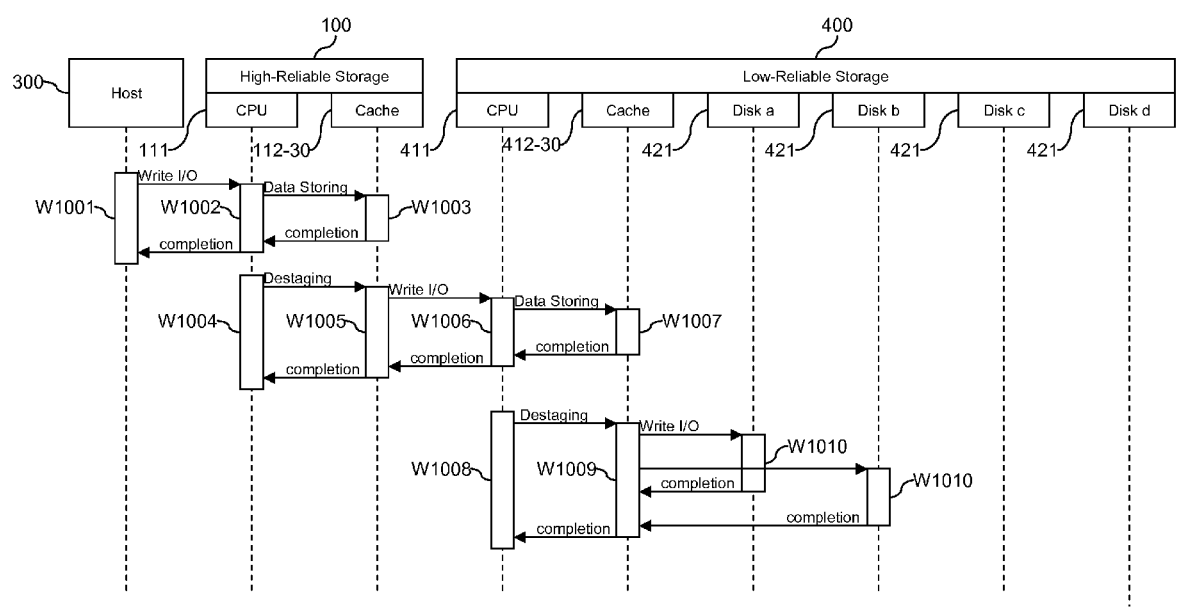
FIG. 18 is a flow diagram illustrating an example of a write I/O process flow of system of FIG. 1.

FIG. 18 illustrates an example of a write operation performed in system of FIG. 1. Host Computer 300 sends write I/O request with the data to be written to the High-Reliable Storage Subsystem 100 (W1001). CPU 111 in the High-Reliable Storage Subsystem 100 receives a write I/O request and stores the data to Cache Slot 112-30-1 in the High-Reliable Storage Subsystem 100 (W1002). Cache Area 112-30 receives write I/O data (W1003). CPU 111 finds dirty cache slot by the Flush Control 112-23 and runs the Destaging Control 112-22-2, which generates an error check code (W1004). Cache Area 112-30 transfers the dirty slot data to the external volume (W1005). CPU 411 in Low-Reliable Storage Subsystem 400 receives a write I/O request and stores the data to Cache Slot 412-30-1 in the Low-Reliable Storage Subsystem 400 (W1006). Cache Area 412-30 receives the write I/O data (W1007). CPU 111 finds dirty cache slot by the Flush Control 112-23 and runs the Destaging Control 112-22-2 (W1008). Cache Area 412-30 transfers the dirty slot data to Disks 421 (W1009). Disks 421 receive and store the data (W1010).

Figure 19:
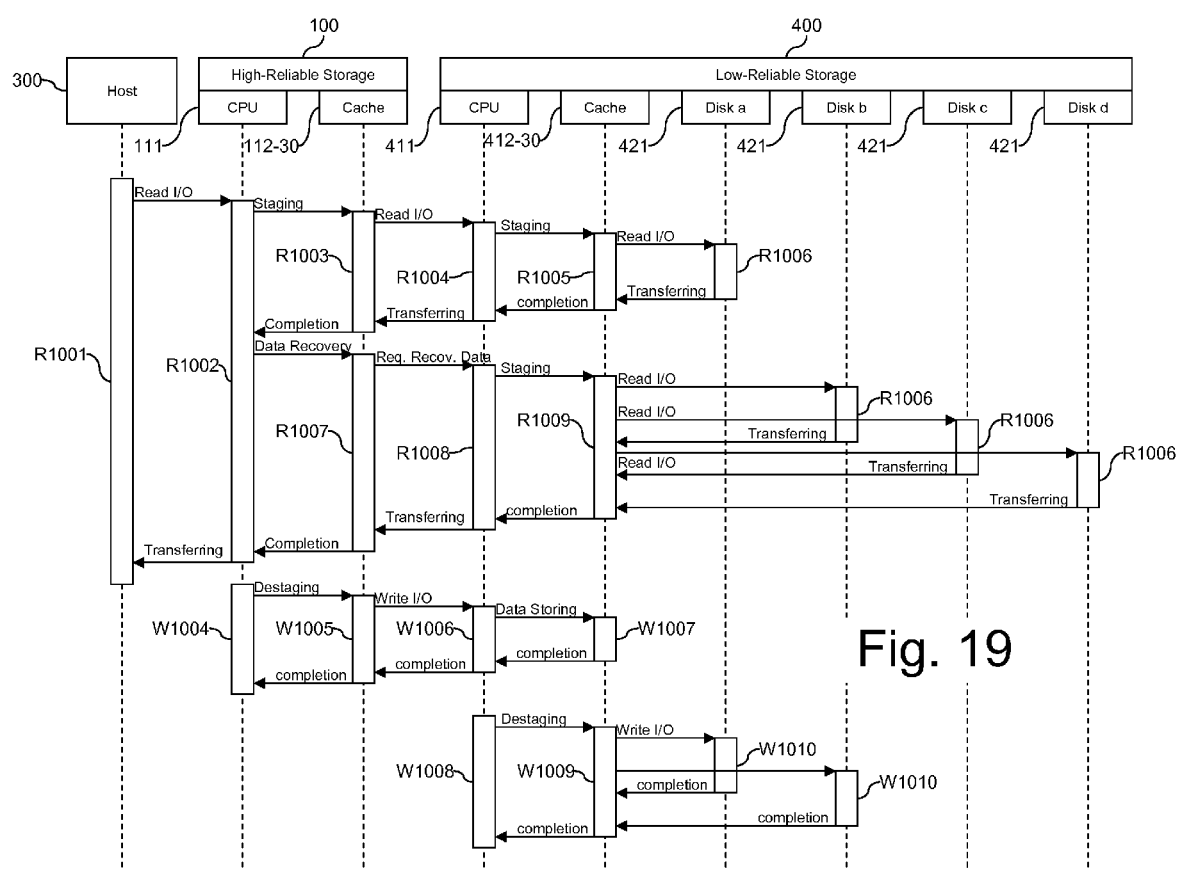
FIG. 19 is a flow diagram illustrating an example of a read I/O process flow of system of FIG. 1.

FIG. 19 illustrates an example of a read operation performed in system of FIG. 1. Host 300 sends a read I/O request to the High-Reliable Storage Subsystem 100 (R1001). CPU 111 in the High-Reliable Storage Subsystem 100 receives the read I/O request and calls the Staging Control 112-22-1 to store the read I/O data to a Cache Slot 112-30-1. The Staging Control 112-22-1 checks if data error exists and recovers the data if any, and then transfers the data (R1002). Cache Area 112-30 requests to read the external volume data and transfers the data to Host 300 (R1003). CPU 411 in the Low-Reliable Storage Subsystem 100 receives the read I/O request and calls the Staging Control 412-22-1 to store the read I/O data to Cache Slot 412-30-1 (R1004). Cache Area 412-30 request to read the disk data from the Disks 421 (R1005). Disks 421 send the data according to the request (R1006). CPU 111 detects an error of the data by calculating an error check code and comparing with the error check code in External Volume Error Check Code 112-11-3 (R1007). Cache Area 112-30 requests to read the recovery data and transfers the data (R1008). CPU 411 in Low-Reliable Storage Subsystem 100 receives a read-recovery-data request and calls Staging Control 112-22-1 to store the read I/O data to Cache Slot 112-30-1 (R1009). If the data was corrupted, the correct data must be written to the cache and disk of the Low-Reliable Storage Subsystem 400 as shown in steps W1004 through W1010. CPU 111 finds dirty cache slot by the Flush Control 112-23 and runs the Destaging Control 112-22-2, which generates an error check code (W1004). Cache Area 412-30 transfers the dirty slot data to the external volume (W1005). CPU 411 in Low Reliable Storage Subsystem 400 receives a write I/O request and stores the data to Cache Slot 412-30-1 in the Low-Reliable Storage Subsystem 400 (W1006). Cache Area 412-30 receives the write I/O data (W1007). CPU 411 finds dirty cache slot by the Flush Control 112-23 and runs the Destaging Control 112-22-2 (W1008). Cache Area 412-30 transfers the dirty slot data to Disks 421 (W1009). Disks 421 receive and store the data (W1010).

Second Embodiment

While in the first embodiment the Storage Controller 110 in the High Reliable Storage Subsystem 100 retrieves the data required to generate the correct data from the Low Reliable Storage Subsystem 400, the second embodiment demonstrates method to generate the correct data by the Storage Controller 410 of the Low Reliable Storage Subsystem 400. Only the differences with the first embodiment will be explained by using FIG. 20 to 22.

Figure 20:
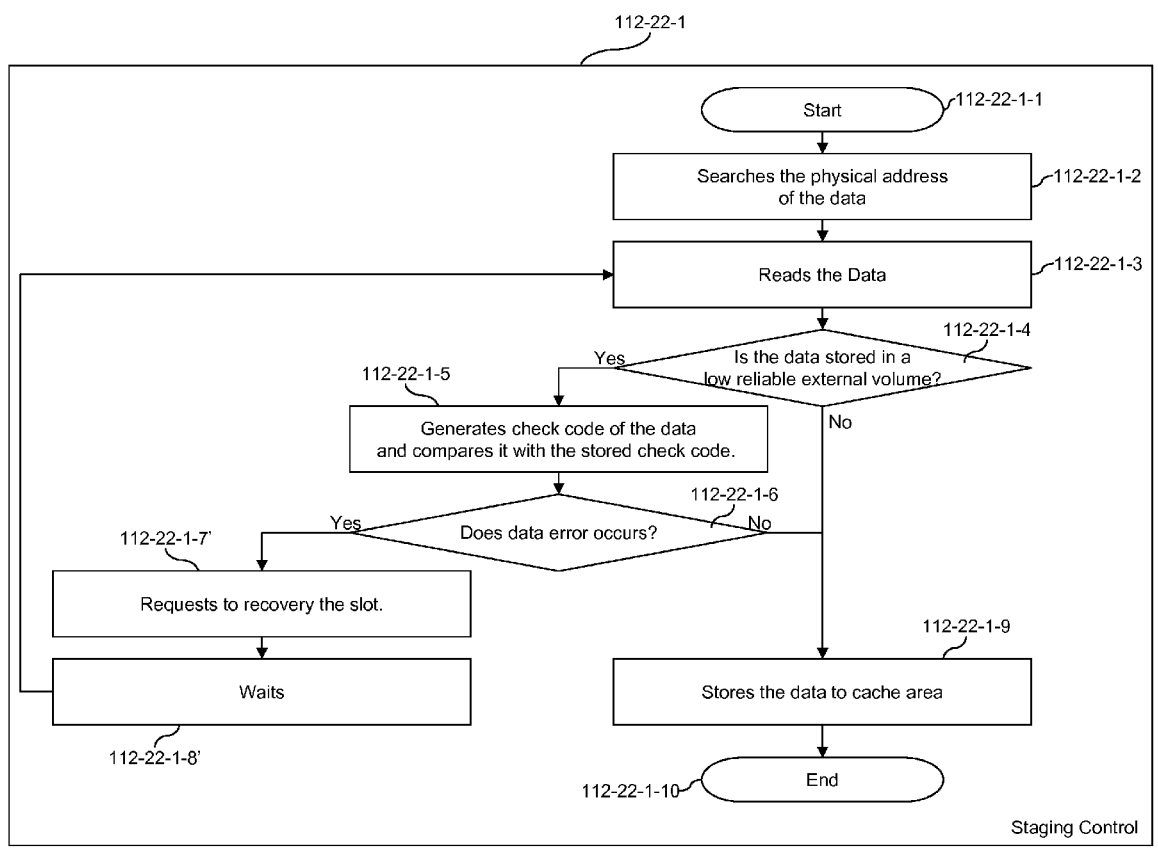
FIG. 20 illustrates an example of a staging control sequence of the storage subsystem 100 of FIG. 1.

FIG. 20 illustrates an example of a process flow of the Staging Control 112-22-1 in the memory 112 of FIG. 2. The program starts at 112-22-1-1. In step 112-22-1-2, the program refers to Volume Management Table 112-11-2 and RAID Group Management Table 112-11-1 to determine the physical disk and address of the data. In step 112-22-1-3, the program requests to read data from the slot of disk 121 and store it to the buffer. In step 112-22-1-4, the program checks whether the data is stored in the external volume allocated by relatively low reliability storage disks using RAID Group Management Table 112-11-1. If the data is stored in relatively low reliability storage disks, the program calculates the hash value from the data in the buffer and compares the calculated hash value with the stored error code in External Volume Error Code Table 112-11-3 in step 112-22-1-5. If the data is not stored in relatively low reliability storage disks, the program proceeds to step 112-22-1-9. In step 112-22-1-6, the program checks whether the compared values matches so that it can detect data error stored in the relatively low reliability storage disks. If the compared values do not match, the program requests for external volume to recovery data in step 112-22-1-7'. Then, in step 112-22-1-8' the program waits for the Low Reliable Storage Subsystem 400 to transfer the correct data instead of generating correct data by itself, and proceeds to step 112-22-1-3 to check if the recovered data which replaced the corrupted data is corrected. If the data is stored in relatively low reliability storage disks and the compared values match, the program proceeds to step 112-22-1-9. In step 112-22-1-9, the program transfers slot data from the buffer to the cache slot 112-30 so that the corrected data would be eventually replaced to the disks and cache in the relatively low reliability storage system by Flush Control 112-23 and Destaging Control 112-22-2. The program ends at 112-22-1-10.

Figure 21:
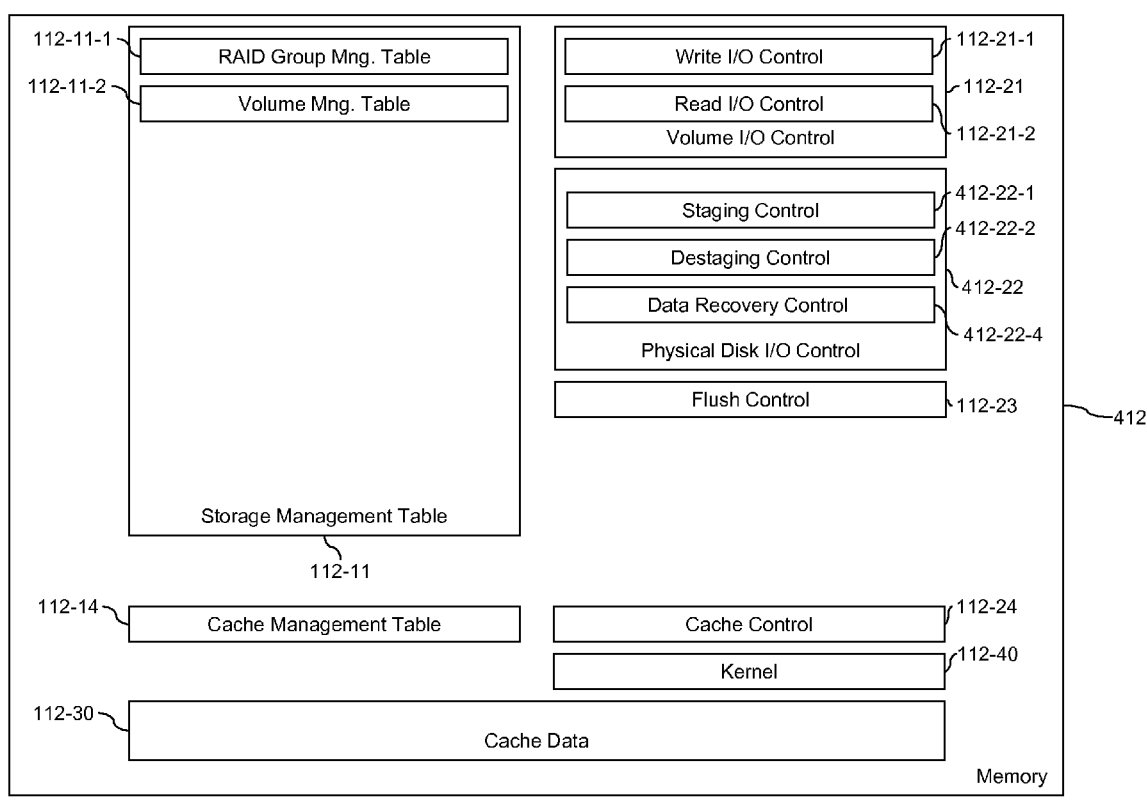
FIG. 21 illustrates an example of a memory in the storage subsystem 400 of FIG. 1.

FIG. 21 illustrates an example of a memory 412 in the storage subsystem 400 of FIG. 1. The difference with the memory 412 in FIG. 14 is that it includes a Data Recovery Control 412-22-4 (FIG. 22) in the Disk Control 412-22. The Data Recovery Control 412-22-4 recovers data of a designated area by using redundant data.

Figure 22:
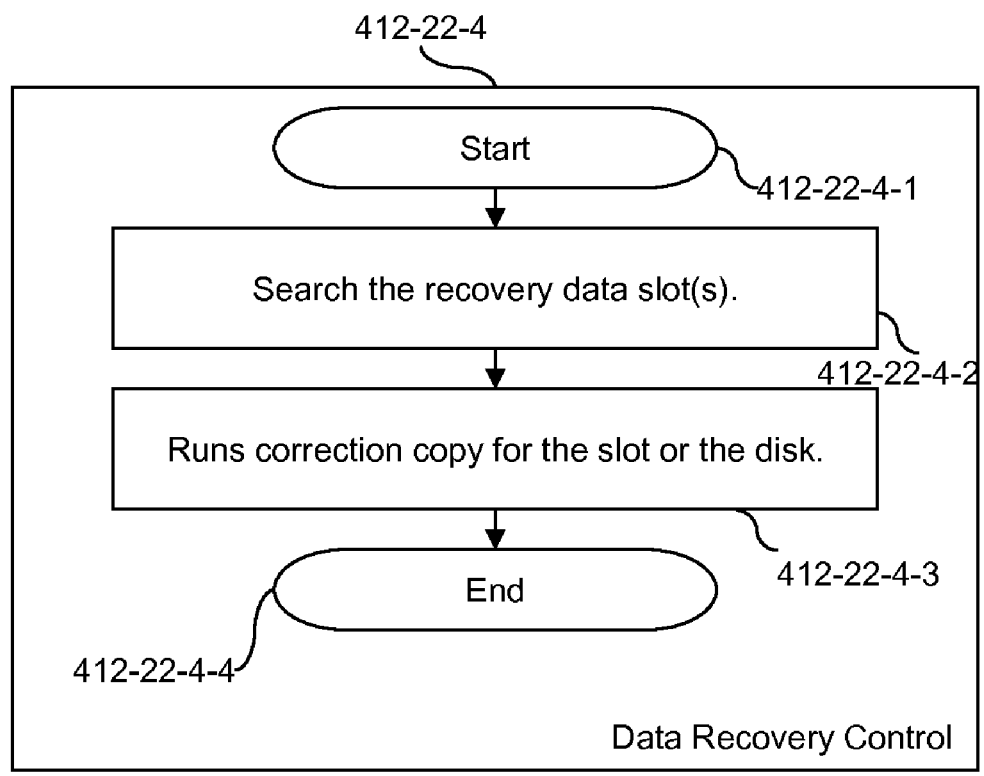
FIG. 22 illustrates an example of a data recovery control sequence of the storage subsystem 100 of FIG. 1.

FIG. 22 illustrates an example of a process flow of the Data Recovery Control 412-22-4 in the memory 412 of FIG. 21. The program starts at 412-22-4-1. In step 412-22-4-2, the program refers to Volume Management Table 112-11-2 and RAID Group Management Table 112-11-1 to determine the physical disk and address of the data. In step 412-22-4-3, the program recovers data by using redundant data. The program ends at 412-22-4-4.

Figure 23:
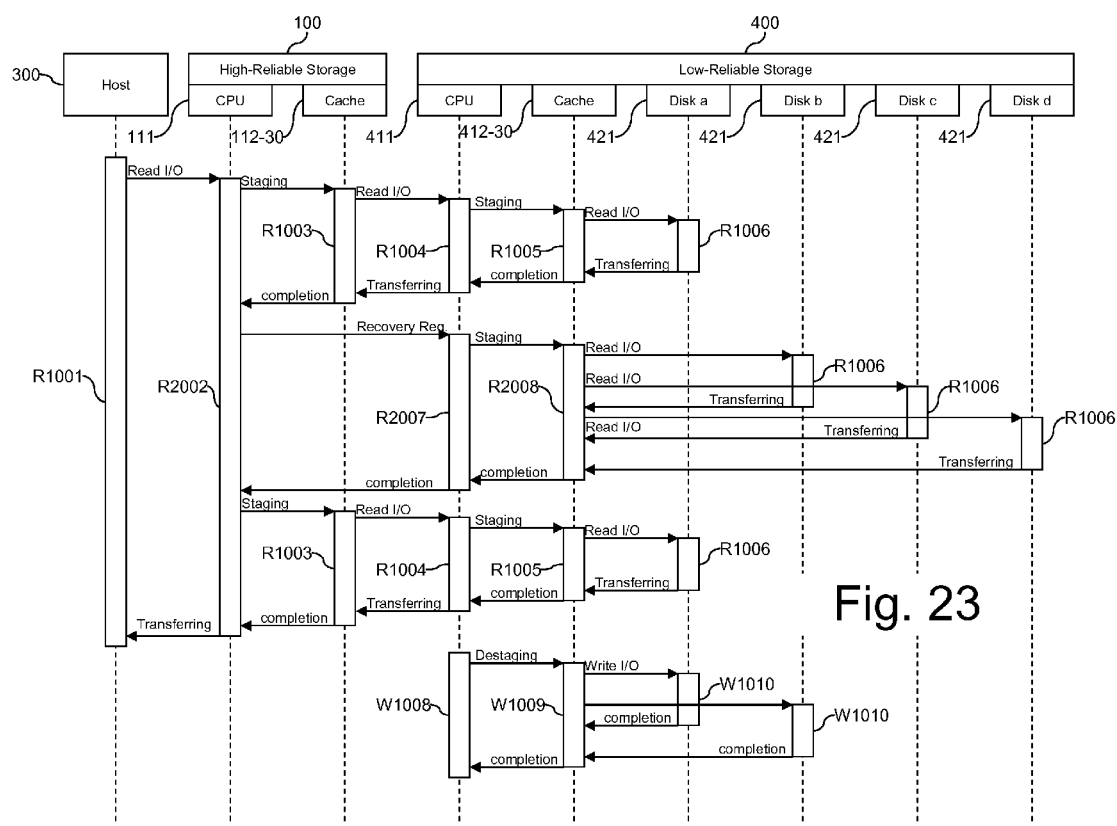
FIG. 23 is a flow diagram illustrating an example of a read I/O process flow of system of FIG. 1.

FIG. 23 illustrates an example of a read operation performed in system of FIG. 1. Host 300 sends a read I/O request to the High-Reliable Storage Subsystem 100 (R1001). CPU 111 in the High-Reliable Storage Subsystem 100 receives the read I/O request and calls the Staging Control 112-22-1 to store the read I/O data to a Cache Slot 112-30-1. The Staging Control 112-22-1 checks if data error exists and requests recovery to the Low Reliable Storage Subsystem 400 if any, and then transfers the data the correct data received by the Low Reliable Storage Subsystem 400 (R2002). Cache Area 112-30 requests to read the external volume data and transfers the data to Host 300 (R1003). CPU 411 in the Low-Reliable Storage Subsystem 100 receives the read I/O request and calls the Staging Control 412-22-1 to store the read I/O data to Cache Slot 412-30-1 (R1004). Cache Area 412-30 request to read the disk data from the Disks 421 (R1005). Disks 421 send the data according to the request (R1006). CPU 411 receives a data recovery request and calls the Data Recovery Control 412-22-4 to recover the data (R2007). Cache Area 412-30 requests to read the external volume recovery data and runs recovery (R2008). Then, the steps R1003 to R1006 is repeated to check if the recovered data is correct. If the data was corrupted, the correct data must be written to the cache and disk of the Low-Reliable Storage Subsystem 400 as shown in steps W1008 through W1010. CPU 411 finds dirty cache slot by the Flush Control 112-23 and runs the Destaging Control 112-22-2 (W1008). Cache Area 412-30 transfers the dirty slot data to Disks 421 (W1009). Disks 421 receive and store the data (W1010).

In the second embodiment, the recovery process is processed by the relatively low reliability storage subsystem. This allows higher processing capacity to the storage subsystem 100 because the load is shifted to the storage subsystem 400. However, the data processing for calculating the correct data is conducted by the storage controller 410, thus the accuracy of the calculation may be lower than if processed by the storage controller 110. Thus, in this embodiment, the hash value of the calculated correct data is matched with the error check code stored in memory 112 before it is actually used to maintain high reliability.

Third Embodiment

In this embodiment, the storage system has more than two Low Reliable Storage Subsystems 400, which duplicate data is stored. Thus, if the data read from one of the Low Reliable Storage Subsystem 400 has corrupted, the data is read from the other Low Reliable Storage Subsystem 400. Only the differences with the first embodiment will be explained by using FIG. 24 to 28.

Figure 24:
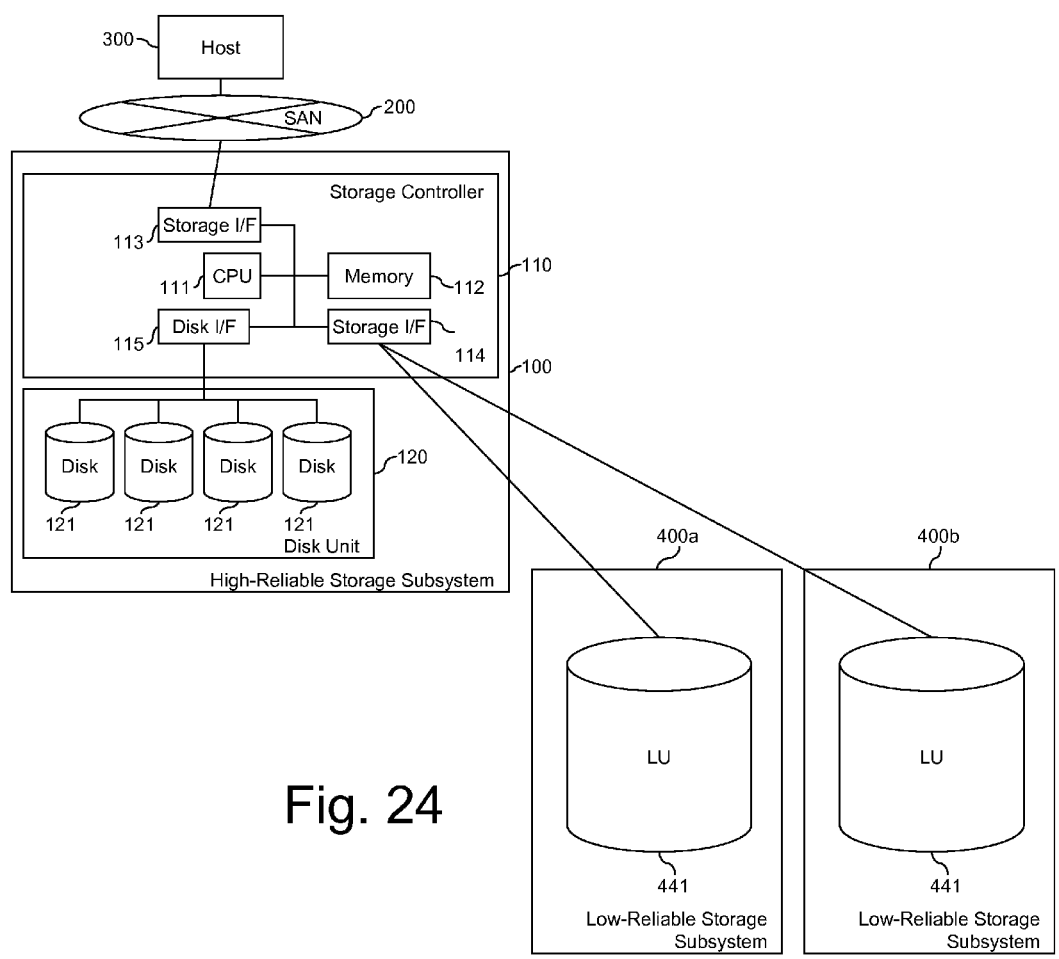
FIG. 24 illustrates an example of overview of a configuration of the invention.

FIG. 24 illustrates the hardware configuration of a system in which the method and apparatus of the invention may be applied. A storage subsystem 100 is connected via a SAN (storage area network) 200 to a host computer 300. The storage subsystem 400 is connected to the Storage subsystem 100 via Fibre Channel (FC). The storage subsystem 100 receives I/O commands from the host computer 200 and provides storage volumes to the host computer 200 using storage devices 121, 421 in both storage subsystems 100, 400. The storage subsystem 100 has higher data reliability than the storage subsystem 400. For example, storage devices used in storage subsystem 100 have higher reliability, such as SAS compared to ones used in storage subsystem 100, such as SATA, or different RAID ranks could be applied.

The storage subsystem 100 has a storage controller 110 that includes a CPU 111, a memory 112, storage interfaces 113, 114, and disk interface 115. The CPU 111 controls the storage subsystem 100, and reads programs and tables from the memory 112. The memory 112 stores the programs and tables. The storage interface 113 connects with a host computer 300 via a storage network 200. The storage interface 114 connects with the storage interfaces of the storage subsystems 400a, b. The disk interface 115 connects with a plurality of storage devices 121, which are stored in a disk unit 120. The storage devices 121 are comprised of solid state devices, such as flash memories, and/or hard disk drives (HDD), for storing data. The storage network 200 connects the storage subsystem 100 and the host computer 300. The host computer 300 sends I/O requests to the storage subsystem 100 via the storage network 200, and sends data to and receives data from the storage subsystem 100 via the storage network 200. The storage subsystems 400a, b has basically the same structure as in the storage subsystems 400 of FIG. 1.

Figure 25:
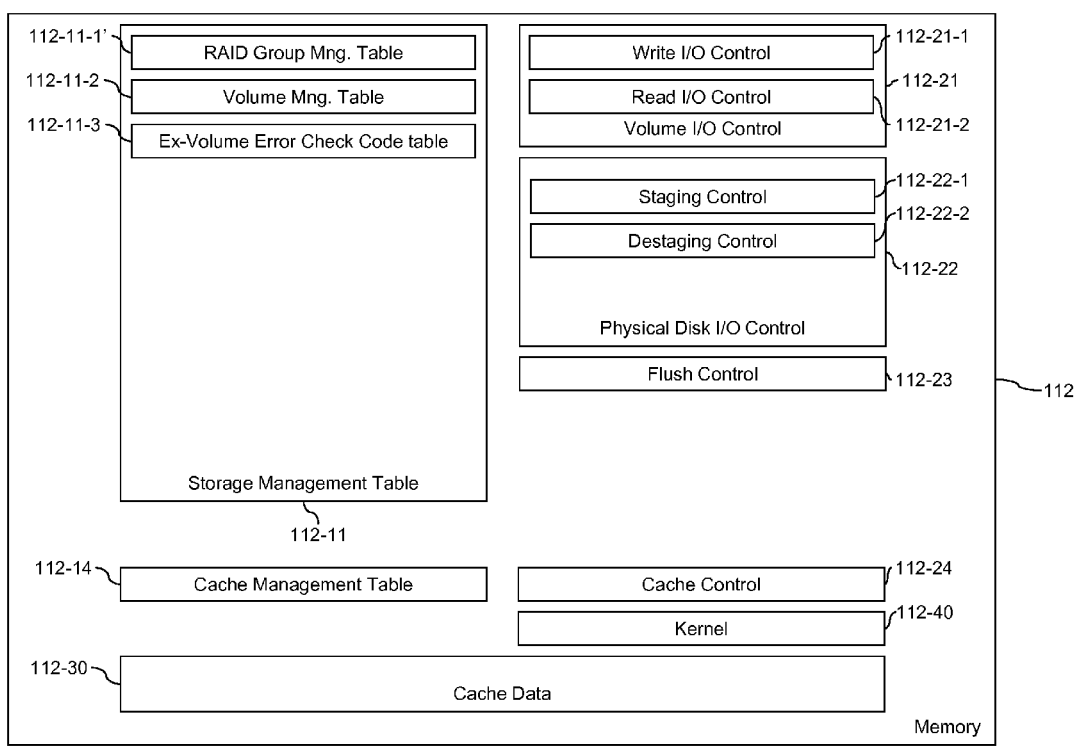
FIG. 25 illustrates an example of a memory in the storage subsystem 100 of FIG. 1.

FIG. 25 illustrates an example of a memory 112 in the storage subsystem 100 of FIG. 24. The memory 112 includes a Storage Management Table 112-11 that includes a RAID Group Management Table 112-11-1', a Volume Management Table 112-11, and an Ex-Volume Error Check Code Table 112-11-3. The RAID Group Management Table 112-11-1' provides physical structure management for storage devices 121, external volumes and those groups, and manages the redundant structure between the two external volumes 441. A Volume Management Table 112-11-2 provides logical volume configuration. An External Volume Error Check Code Table 112-11-3 stores error check code for some areas of external volumes. The value of error check code for an area is calculated from data stored in such area by hash calculation. A Cache Management Table 112-14 is provided for managing the cache data area 112-30 and for LRU/MRU management. A Volume I/O Control 112-21 includes a Write I/O Control 112-21-1 (FIG. 8) that runs by a write I/O requirement and receives write data and stores to the cache data area 112, and a Read I/O Control 112-21-2 (FIG. 9) that runs by a read I/O requirement and sends read data from the cache data area 112. A Disk Control 112-22 includes a Staging Control 112-22-1 (FIG. 10) that transfers data from the disks 121 to the cache data area 112, a Destaging Control 112-22-2 (FIG. 11) that transfers data from the cache data area 112 to the disks 121. The memory 112 further includes a Flush Control 112-23 (FIG. 12) that periodically flushes dirty data from the cache data area to the disks 121, and a Cache Control 112-24 that finds cached data in the cache data area and allocates a new cache area in the cache data area. The memory 112 includes a Cache Data Area 112-30 that stores read and write cache data. The area is divided for a plurality of cache slots. Each cache slot is allocated for a data stripe. The memory 112 includes a kernel 112-40 that controls the schedules of running program, supports a multi-task environment. If a program waits for an ack (acknowledgement), the CPU 111 changes to run another task (e.g., data transfer waiting from the disk 121 to the cache data area 112-30).

Figure 27:
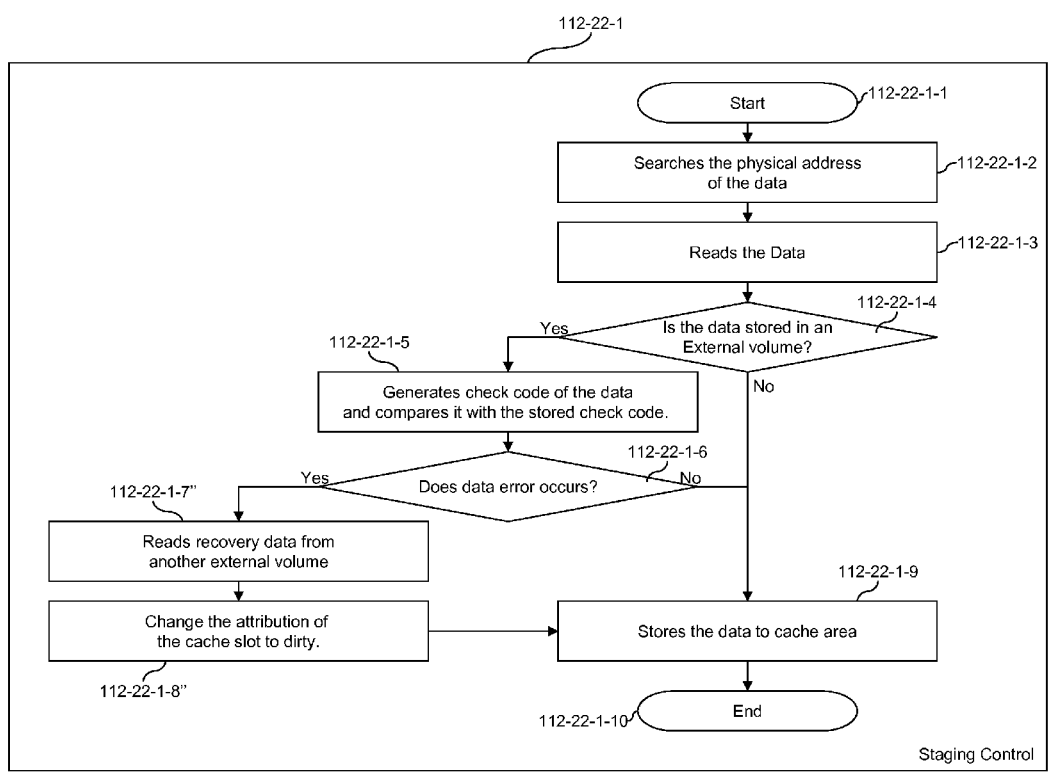
FIG. 27 illustrates an example of a staging control sequence of the storage subsystem 100 of FIG. 1.

FIG. 26 illustrates an example of a RAID Group Management Table 112-11-1' in the memory 112 of FIG. 2. The RAID Group Management Table 112-11-1' includes columns of the RAID Group Number 112-11-1-1 as the ID of the RAID group, and RAID Level 112-11-1-2 representing the structure of RAID group. For example, the numbers means that RAID Level is the number ("5" means that the "RAID Level is 5"). "NULL" means the RAID Group does not exist. "Ext" means the RAID Group exists as an external volume outside of the internal volume. The RAID Group Management Table 112-11-1' includes columns 112-11-1-3 of the HDD Number representing the ID list of HDDs belonging to the RAID group in case if it is an internal volume or WWN in case if it is an external volume. If the RAID group consists of two external volumes, the column includes two set of WWN since the external volume would store redundant data. The RAID Group Management Table 112-11-1' further includes RAID Group Capacity 112-11-1-4 representing the total capacity of the RAID group except redundant area FIG. 27 illustrates an example of a process flow of the Staging Control 112-22-1 in the memory 112 of FIG. 25. The program starts at 112-22-1-1. In step 112-22-1-2, the program refers to Volume Management Table 112-11-2 and RAID Group Management Table 112-11-1' to determine the physical disk and address of the data. In step 112-22-1-3, the program requests to read data from the slot of disk 121 and store it to the buffer. In step 112-22-1-4, the program checks whether the data is stored in the external volume. If the data is stored in the external volume, the program calculates the hash value from the data in the buffer and compares the calculated hash value with the stored error code in External Volume Error Code Table 112-11-3 in step 112-22-1-5. If the data is not stored in relatively low reliability storage disks, the program proceeds to step 112-22-1-9. In step 112-22-1-6, the program checks whether the compared values matches so that it can detect data error stored in the relatively low reliability storage disks. If the compared values do not match, the program reads recovery data from the other external volume in step 112-22-1-7". Then, in step 112-22-1-8" the program sets dirty attribution against the recovered slot. The correct data will be stored in the buffer. It would not have to generate correct data since the external volumes stores duplicate data. If the data is stored in external volume and the compared values match, the program proceeds to step 112-22-1-9. In step 112-22-1-9, the program transfers slot data from the buffer to the cache slot 112-30 so that the corrected data would eventually be replaced to the disks and cache in the relatively low reliability storage system including the data, which its hash value did not match, by Flush Control 112-23 and Destaging Control 112-22-2. The program ends at 112-22-1-10.

Figure 28:
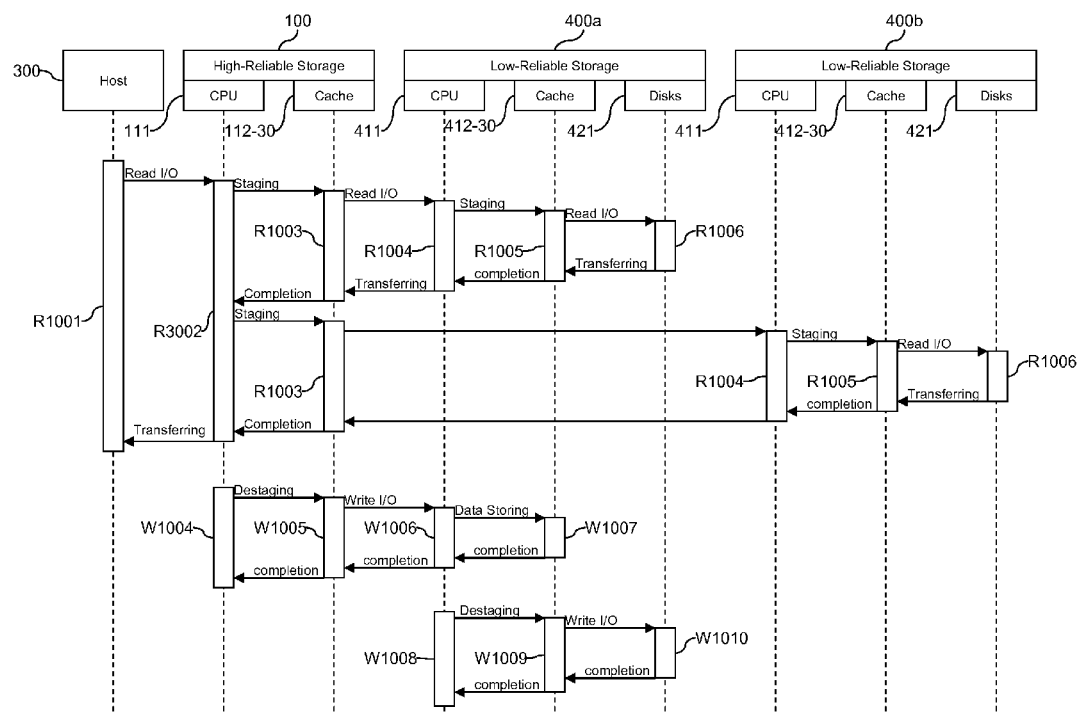
FIG. 28 illustrates an example of a flow diagram illustrating an example of a read I/O process flow of system of FIG. 24.

FIG. 28 illustrates an example of a read operation performed in system of FIG. 24. Host 300 sends a read I/O request to the High-Reliable Storage Subsystem 100 (R1001). CPU 111 in the High-Reliable Storage Subsystem 100 receives the read I/O request and calls the Staging Control 112-22-1 to store the read I/O data to a Cache Slot 112-30-1. The Staging Control 112-22-1 checks if data error exists and reads data from the other external volume if any error exists, and then transfers the data to the Host 300 (R3002). Cache Area 112-30 requests to read the external volume data (R1003). CPU 411 in the Low-Reliable Storage Subsystem 100 receives the read I/O request and calls the Staging Control 412-22-1 to store the read I/O data to Cache Slot 412-30-1 (R1004). Cache Area 412-30 request to read the disk data from the Disks 421 (R1005). Disks 421 send the data according to the request (R1006). If the data stored in the Low-Reliable Storage Subsystem 400a was corrupted, the correct data obtained by the Low-Reliable Storage Subsystem 400b must be written to the cache and disk of the Low-Reliable Storage Subsystem 400a as shown in steps W1004 through W1010. CPU 111 finds dirty cache slot by the Flush Control 112-23 and runs the Destaging Control 112-22-2, which generates an error check code (W1004). Cache Area 412-30 transfers the dirty slot data to the external volume (W1005). CPU 411 in Low Reliable Storage Subsystem 400 receives a write I/O request and stores the data to Cache Slot 412-30-1 in the Low-Reliable Storage Subsystem 400 (W1006). Cache Area 412-30 receives the write I/O data (W1007). CPU 411 finds dirty cache slot by the Flush Control 112-23 and runs the Destaging Control 112-22-2 (W1008). Cache Area 412-30 transfers the dirty slot data to Disks 421 (W1009). Disks 421 receive and store the data (W1010).

In the third embodiment, there is no recovery process needed by either the storage subsystem 100 or 400. This allows higher processing capacity to the storage subsystems 100,400, although it requires data to be written to two external storage systems.

The present invention provides a storage system, which costs, can be saved by using relatively low reliability storage disks, but maintaining high reliability as a whole system by keeping the error code for the relatively low reliability storage disks in the relatively high reliability storage system. Having described my invention, however, many modifications thereto will become apparent to those skilled in the art to which it pertains without deviation from the spirit of the invention as defined by the scope of the appended claims.

The invention claimed is:

1. A system comprising:
a first storage system including:
a first port to receive I/O operations from host computers;
a first storage controller including a first processor and first memory; and
a plurality of first storage devices, which stores data received from said host computers, and
a second storage system including:
a second port to receive I/O operations from said host computers via said first storage controller;
a second storage controller including a second processor and second memory; and
a plurality of second storage devices, which stores data received from said host computers,
wherein error check codes corresponding to data stored in said plurality of second storage devices are stored in said first storage system,
wherein, in response to I/O operations from said host computers to read data of a virtual volume, where the data are stored in said second storage system, check codes of the data stored are calculated and compared with corresponding error check codes for the data of the virtual volume and the corresponding error check codes are stored in said first storage system, and
wherein, if the result of the comparison indicates that the check codes and corresponding error check codes match, the data stored in said second storage system are transferred to said host computers.

2. The system according to claim 1,
wherein said plurality of first storage devices have a higher reliability than said plurality of second storage devices, and
wherein said error check codes are calculated by a first storage controller and are stored in said first memory.

3. The system according to claim 1,
wherein, in response to write I/O operations from said host computers to write data to the virtual volume, where the data are to be stored in said second storage system, said data are received in said first memory via said first port, said error check codes are generated by the first storage controller for the data received, and then said data are stored to said plurality of second storage devices via said second port, and
wherein said error check codes are generated by using hash function.

4. The system according to claim 1,
wherein, if the result of the comparison indicates that the check codes and corresponding error check codes do not match, the data stored in said second storage system are recovered by said second storage controller and then transferred to said host computers via said second and first ports.

5. The system according to claim 4,
wherein the data stored in the second storage system are stored by RAID level 5 and the data are recovered by using parity bits of the corresponding striped set.

6. The system according to claim 1,
wherein, if the result of the comparison indicates that the check codes and corresponding error check codes do not match, the data stored in said second storage system are recovered by said first storage controller using parity stored in said second storage system.

7. A system comprising:
a first storage system including:
a first port to receive I/O operations from host computers;
a first storage controller including a first processor and first memory; and
a plurality of first storage devices, which stores data received from said host computers,
a second storage system including:
a second port to receive I/O operations from said host computers via said first storage controller;
a second storage controller including a second processor and second memory; and
a plurality of second storage devices, which stores data received from said host computers, and
a third storage system including;
a third port to receive I/O operations from host computers;
a third storage controller including a third processor and third memory; and
a plurality of third storage devices, which stored data received from said host computers,
wherein error check codes corresponding to data stored in said plurality of second storage devices are stored in said first storage system,
wherein error check codes corresponding to data stored in said plurality of third storage devices are stored in said first storage system,
wherein said plurality of third storage devices stores duplicate data of said plurality of second storage devices,
wherein, in response to I/O operations from said host computers to read data of a virtual volume, where the data are stored in said second storage system, check codes of the data stored are calculated and compared with corresponding error check codes for the data of the virtual volume and the corresponding error check codes are stored in said first storage system, and
wherein, if the result of the comparison indicates that the check codes and corresponding error check codes do not match, the data stored in said third storage system are transferred to said host computers via said third and first ports.

8. The system according to claim 7,
if the result of the comparison indicates that the check codes and corresponding error check codes match, the data stored in said second storage system are transferred to said host computers.

9. The system according to claim 8,
wherein in response to I/O operations from said host computers to write data to the virtual volume, where the data are to be stored in said second storage system, said data are received in said first memory via said first port, error check codes are generated by the first storage controller for the data received, and then said data are stored to said plurality of second and third storage devices, and
wherein said error check codes are generated by using hash function.

10. A method for controlling an external storage system coupled to a first storage system comprising the steps of:
receiving a write I/O operation, for writing data to a virtual volume, which is sent from a host computer to said external storage via said first storage system;
calculating error check codes of data to be written by the write I/O operation by a first storage controller of said first storage system;
storing said error check codes to said first storage system;
storing said data to be written by the write I/O operation to a volume in said external storage system;

receiving a read I/O operation, for reading the data of the virtual volume, which is sent from a host computer to said external storage system via said first storage system;

calculating check code of data subject to the read I/O operation by said first storage system;

comparing said calculated check code with the corresponding error check codes stored in said first storage system; and transferring said data subject to the read I/O operation from said external storage system to said host computer if the result of the comparison indicates that the check codes and corresponding error check codes match.

11. The method according to claim 10, further comprising the step of:

requesting recovery data to said external storage system and calculating correct data based on the recovery data by said first storage controller if the result of the comparison indicates that the check codes and corresponding error check codes do not match.

12. The method according to claim 11, further comprising the step of:

writing the correct data to a corresponding cache slot of said first storage system.

13. The method according to claim 10, further comprising the step of:

calculating correct data by said second storage controller if the result of the comparison indicates that the check codes and corresponding error check codes do not match.

14. The method according to claim 13, further comprising the steps of:

calculating a hash value of the correct data and comparing said hash value of the correct data with the corresponding error check code stored in said first storage system;

if the hash value of the correct data and the corresponding error check code match, transferring said correct data to said host computer.

15. The method according to claim 10, further comprising the step of:

transferring data from a second storage system if the result of the comparison indicates that the check codes and corresponding error check codes do not match, wherein said second storage system stores duplicate data written to said external storage system and is coupled to said first storage system.

* * * * *